US010675947B2

(12) United States Patent
Motomura et al.

(10) Patent No.: US 10,675,947 B2
(45) Date of Patent: Jun. 9, 2020

(54) AIR BLOWER DEVICE

(71) Applicant: DENSO CORPORATION, Kariya, Aichi-pref. (JP)

(72) Inventors: Hirohisa Motomura, Kariya (JP); Yasuhiko Niimi, Kariya (JP); Takeyuki Otsuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 266 days.

(21) Appl. No.: 15/550,970

(22) PCT Filed: Feb. 12, 2016

(86) PCT No.: PCT/JP2016/054109
§ 371 (c)(1),
(2) Date: Aug. 14, 2017

(87) PCT Pub. No.: WO2016/143455
PCT Pub. Date: Sep. 15, 2016

(65) Prior Publication Data
US 2018/0043752 A1 Feb. 15, 2018

(30) Foreign Application Priority Data
Mar. 11, 2015 (JP) .................. 2015-048709

(51) Int. Cl.
*B60H 1/24* (2006.01)
*B60H 1/34* (2006.01)
*B60K 37/02* (2006.01)

(52) U.S. Cl.
CPC .......... *B60H 1/242* (2013.01); *B60H 1/3414* (2013.01); *B60K 37/02* (2013.01); *B60H 2001/3492* (2013.01); *B60K 2370/658* (2019.05)

(58) Field of Classification Search
USPC .......................... 454/121, 127, 143, 152, 155
See application file for complete search history.

(56) References Cited

U.S. PATENT DOCUMENTS 6,019,677 A * 2/2000 Demster .................... F24F 7/10
454/289
6,206,776 B1 * 3/2001 Weindorf ........... B60H 1/00842
454/143

(Continued)

FOREIGN PATENT DOCUMENTS

DE 3818666 A1 * 12/1988 ............. B60H 1/242
JP S56174310 U 12/1981
(Continued)

*Primary Examiner* — Vivek K Shirsat
*Assistant Examiner* — Ko-Wei Lin
(74) *Attorney, Agent, or Firm* — Harness, Dickey & Pierce, P.L.C.

(57) ABSTRACT

An air blower device includes: a blow-out portion A having an outlet A opening in a meter peripheral region to blow out air from an air sending device to the vehicle rear side through an inner side of a steering wheel provided between the meter panel and the driver's seat in a vehicle front-rear direction, wherein the meter peripheral region includes: a portion, which is other than a meter in a meter panel provided on a vehicle front side of a driver's seat in a compartment; and a meter hood provided to spread in a vehicle width direction above the meter panel and protruding to a vehicle rear side farther than the meter panel; and a blowing direction regulation device provided to the blow-out portion A, having an air guiding surface A along which air blown out from the outlet A flows, and regulating a blowing direction of air blown out from the outlet A by changing an angle of the air guiding surface A.

17 Claims, 18 Drawing Sheets

(56) References Cited

U.S. PATENT DOCUMENTS

| | | | |
|---|---|---|---|
| 2002/0164941 A1* | 11/2002 | Elliot | ............... B60H 1/242 |
| | | | 454/121 |
| 2005/0146885 A1 | 7/2005 | Sumiyoshi | |
| 2010/0026034 A1* | 2/2010 | Storgato | ............ B60H 1/00835 |
| | | | 296/70 |
| 2016/0039389 A1 | 2/2016 | Kato et al. | |

FOREIGN PATENT DOCUMENTS

| | | |
|---|---|---|
| JP | S61189820 U | 11/1986 |
| JP | H03-02801 A | 2/1991 |
| JP | 2004148965 A | 5/2004 |
| JP | 2005077204 A | 3/2005 |
| JP | 2005081966 A | 3/2005 |
| JP | 2005096536 A | 4/2005 |
| JP | 2005096639 A | 4/2005 |
| JP | 2005207756 A | 8/2005 |
| JP | 2005207757 A | 8/2005 |
| JP | 2014210564 A | 11/2014 |
| JP | 2015020566 A | 2/2015 |

* cited by examiner

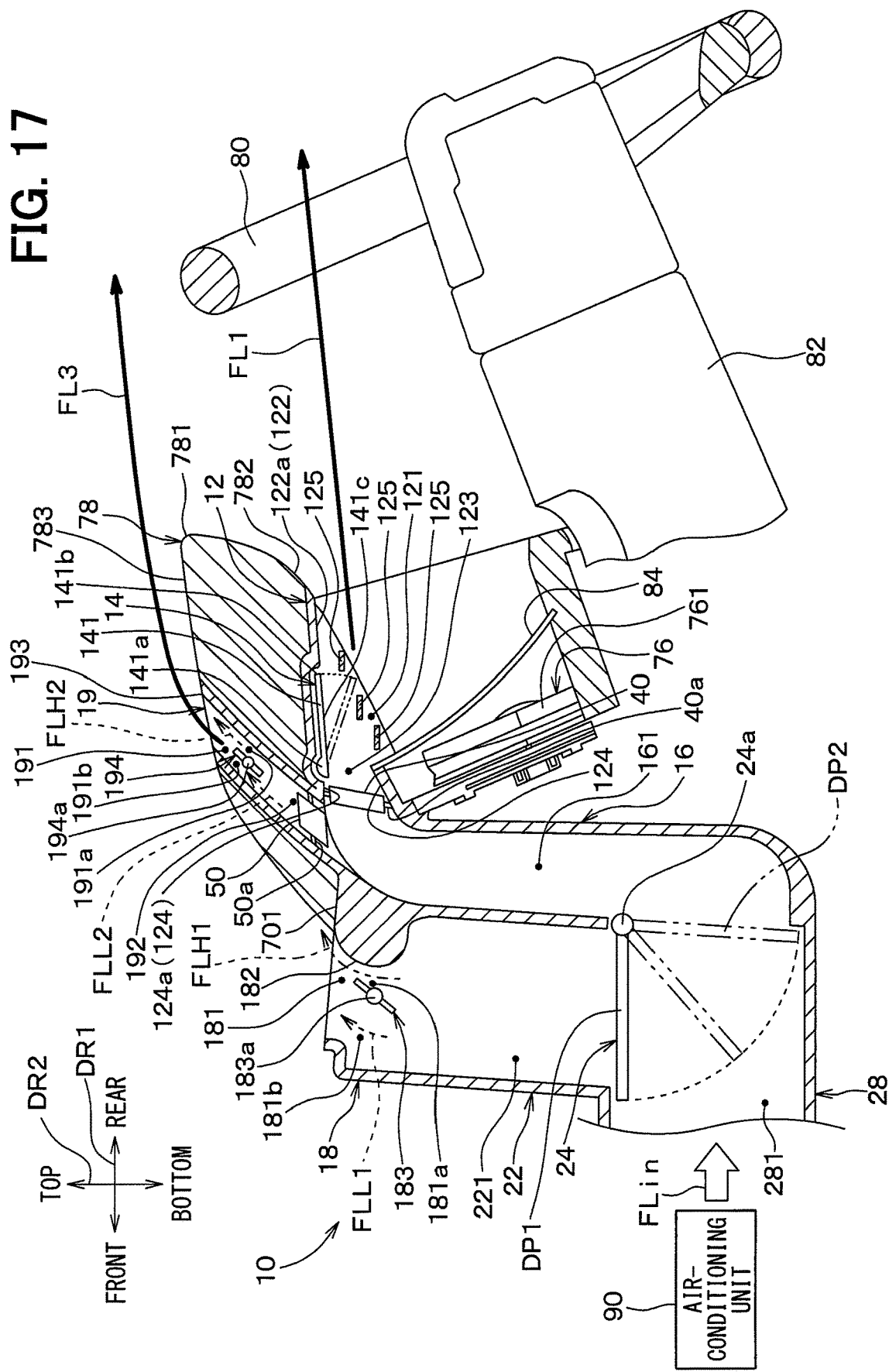

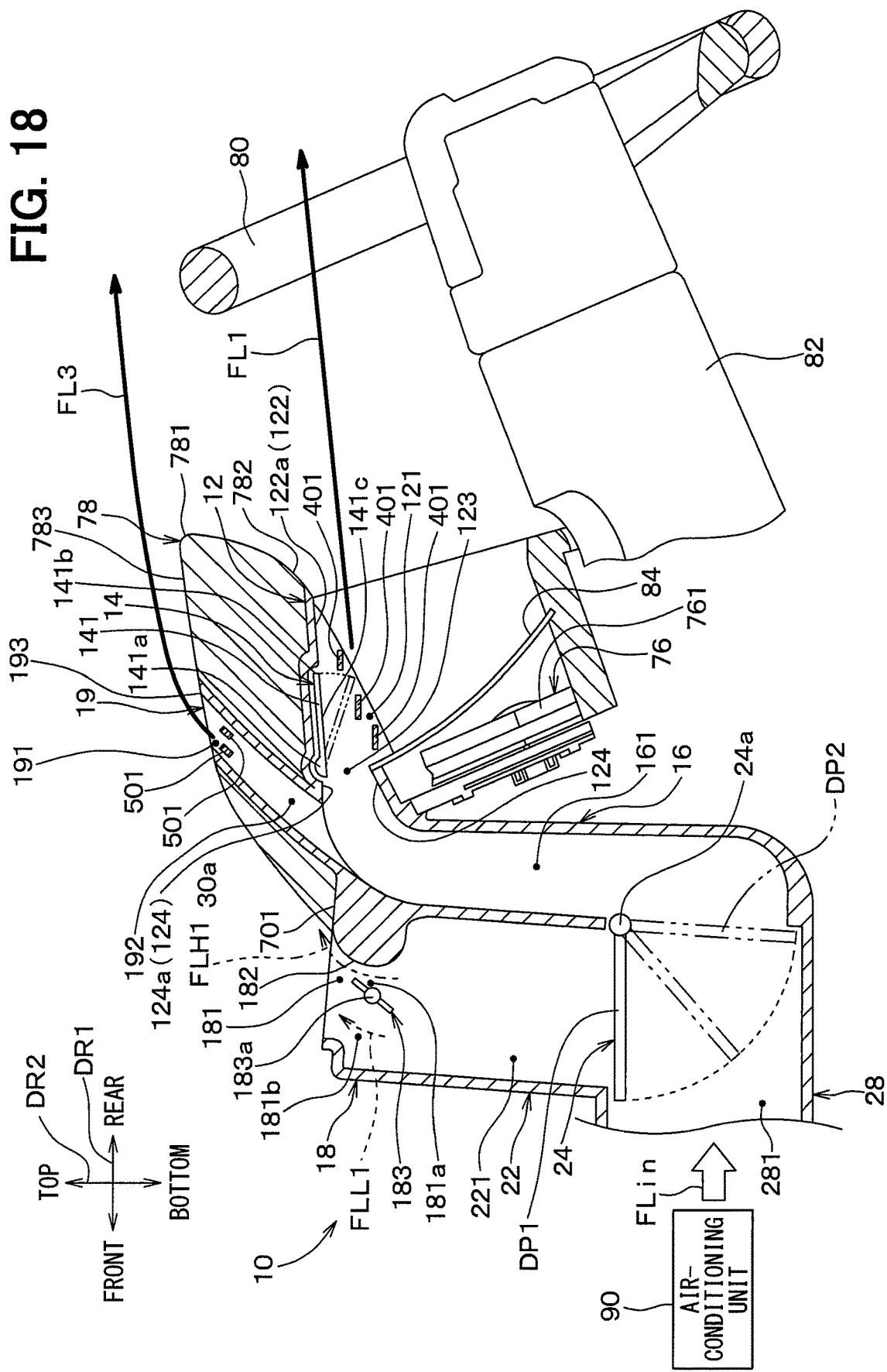

AIR BLOWER DEVICE

CROSS REFERENCE TO RELATED APPLICATIONS

This application is a U.S. National Phase Application under 35 U.S.C. 371 of International Application No. PCT/JP2016/054109 filed on Feb. 12, 2016 and published in Japanese as WO 2016/143455 A1 on Sep. 15, 2016. This application is based on and claims the benefit of priority from Japanese Patent Application No. 2015-048709 filed on Mar. 11, 2015. The entire disclosures of all of the above applications are incorporated herein by reference.

TECHNICAL FIELD

The present disclosure relates to an air blower device which blows out air into a compartment.

BACKGROUND ART

An air blower device in the related art of a type described above is described in, for example, Patent Literature 1. Patent Literature 1 describes that a display unit for a vehicle including a meter, such as a speedometer, is furnished with a function of an air blower device.

The display unit for a vehicle described in Patent Literature 1 has a meter panel formed by combining a meter and an air outlet into one unit. The meter of the meter panel includes a pointer rotating region having a calibrated scale on an outer periphery, and a pointer having a rotation center on an inner side of the pointer rotating region. In addition, an air outlet is provided on the inner side of the pointer rotating region and air is blown out from the air outlet.

PRIOR TECHNICAL LITERATURE

Patent Literature

Patent Literature 1: US Unexamined Patent Application Publication No. 2005/0146885

SUMMARY OF INVENTION

In the display unit for a vehicle described in Patent Literature 1, while the inner side of the pointer rotating region is a portion where the air outlet is provided, the rotation center of the pointer is present on the inner side of the pointer rotating region besides the air outlet. Accordingly, a motor and an electronic board used to rotate the pointer are installed to the portion where the air outlet is provided. Hence, the air outlet is substantially narrowed by the motor and the electronic board. Consequently, only a small volume of air is blown out from the air outlet and it is difficult for the display unit for a vehicle described in Patent Literature 1 to blow out a sufficient volume of air to a driver.

The present disclosure has an object to provide an air blower device capable of blowing out a sufficient volume of air to a driver from in front of the driver.

To accomplish the above object, in view of an aspect of the present disclosure, an air blower device comprises: a blow-out portion A having an outlet A opening in a meter peripheral region to blow out air from an air sending device to the vehicle rear side through an inner side of a steering wheel provided between the meter panel and the driver's seat in a vehicle front-rear direction, wherein the meter peripheral region includes: a portion, which is other than a meter in a meter panel provided on a vehicle front side of a driver's seat in a compartment; and a meter hood provided to spread in a vehicle width direction above the meter panel and protruding to a vehicle rear side farther than the meter panel; and a blowing direction regulation device provided to the blow-out portion A, having an air guiding surface A along which air blown out from the outlet A flows, and regulating a blowing direction of air blown out from the outlet A by changing an angle of the air guiding surface A.

According to the present disclosure, the air blower device is provided with the outlet A which opens in the meter peripheral region to blow out air from the air sending device to the vehicle rear side through the inner side of the steering wheel. Hence, by making the outlet A as a large opening, air can be blown out from a neighborhood of a driver. A sufficient volume of air can be thus blown to the driver from in front of the driver. The blowing direction regulation device provided to the blow-out portion A regulates a blowing direction of air blown out from the outlet A by changing an angle of the air guiding surface A. Hence, a blowing direction of air blown out from the outlet A can be regulated while ensuring a large volume of air. Consequently, an air sending range within which to send air from the outlet A to the driver can be widened.

BRIEF DESCRIPTION OF THE DRAWINGS

FIG. 17 is a view showing another embodiment; and

FIG. 18 is a view showing still another embodiment.

DESCRIPTION OF EMBODIMENTS

Figure 1:
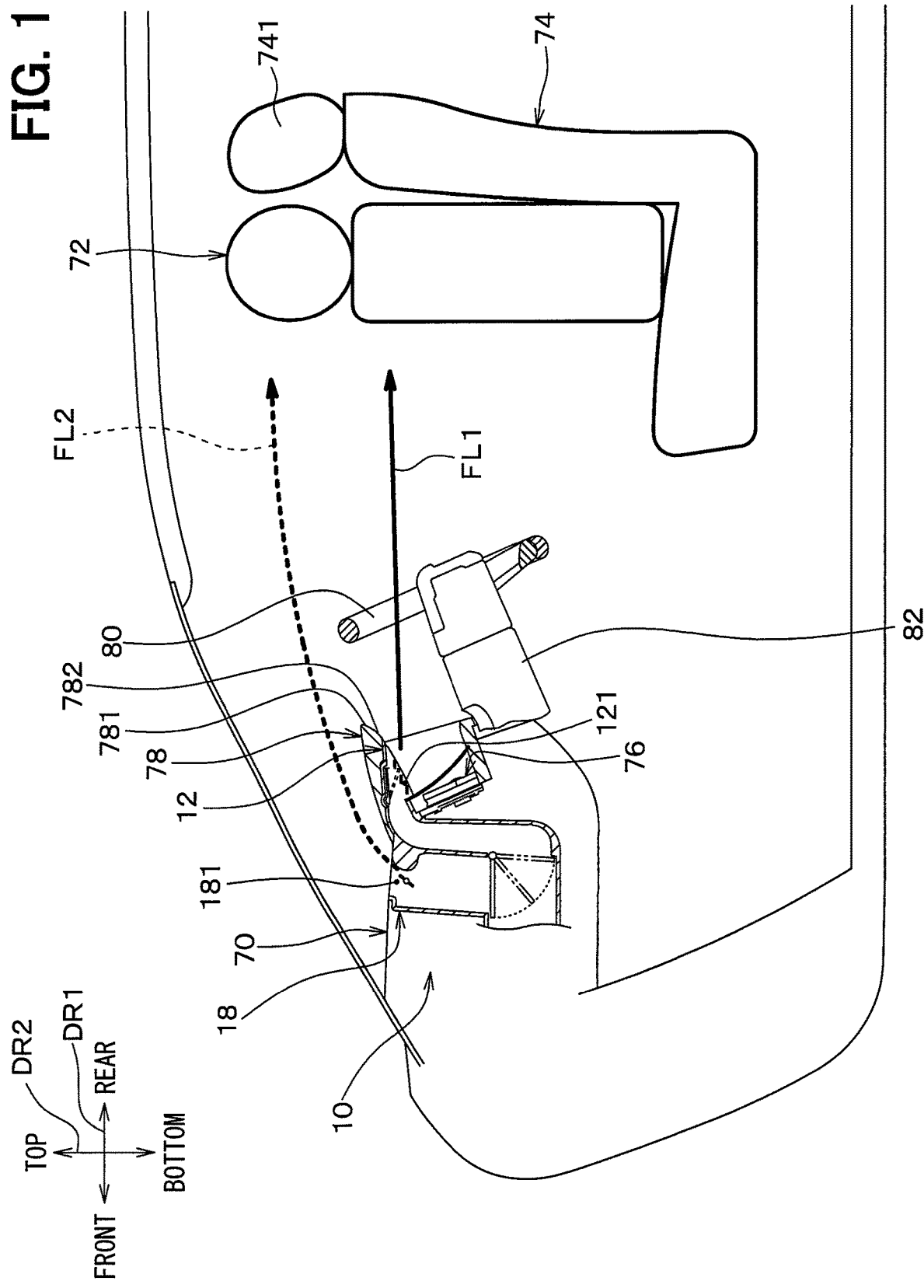
FIG. 1 is a schematic view showing a location of an air blower device of a first embodiment in a compartment and flows of air which the air blower device blows out into the compartment.

Hereinafter, embodiments of the present disclosure will be described with reference to the drawings. Same or equivalent portions in respective embodiments below including "other embodiments" are labeled with same reference numerals in the drawings.

First Embodiment

FIG. 1 is a schematic view showing a location of an air blower device 10 of the present embodiment in a compartment and flows of air which the blower device 10 blows out into the compartment. The air blower device 10 is used as, for example, a part of an outlet of an air-conditioning unit 90 and a duct both installed on a vehicle front side in the compartment.

Figure 2:
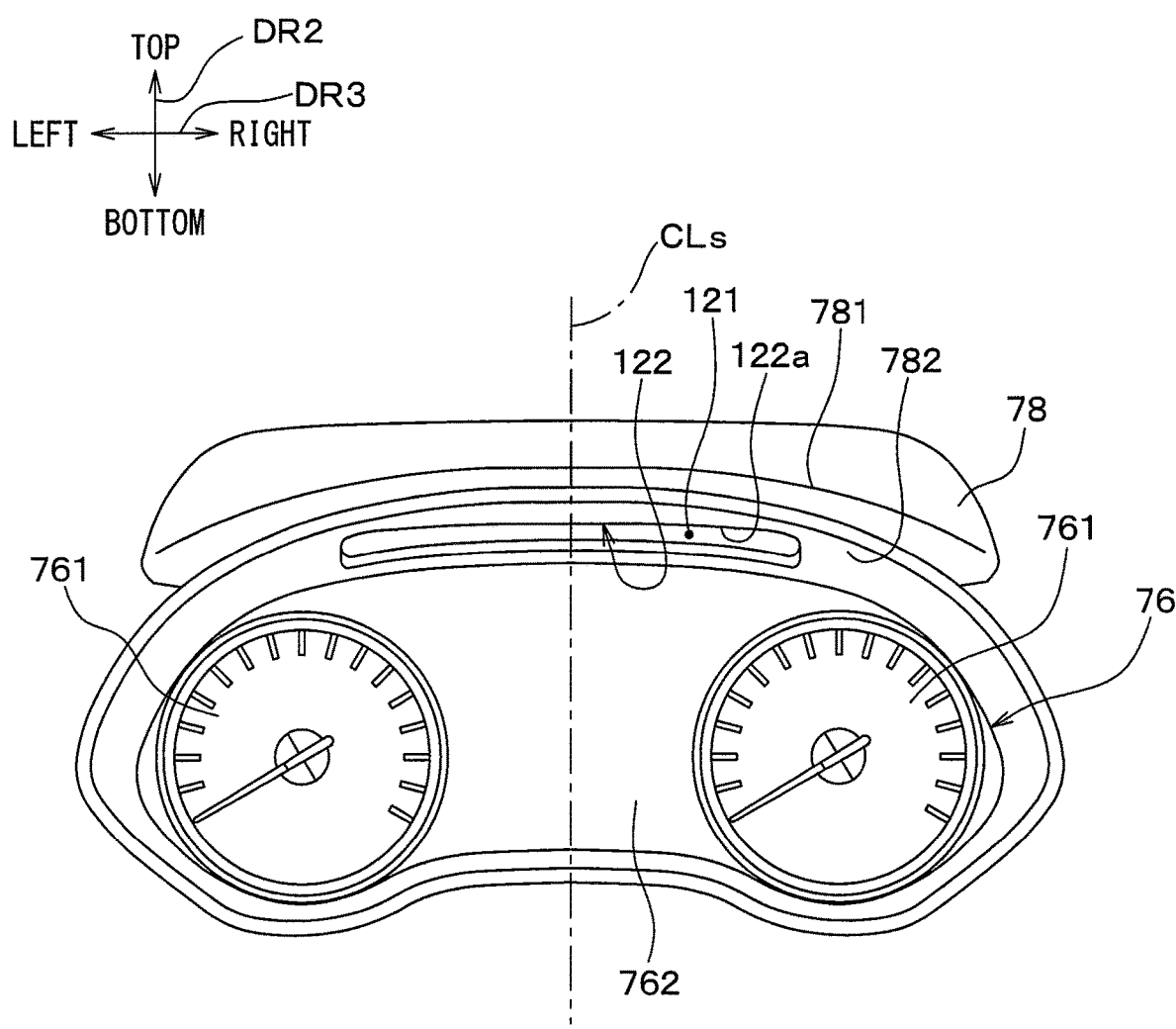
FIG. 2 is a view of a meter panel and a meter hood of the first embodiment when viewed from a driver in a driving posture where a steering wheel is omitted.

As is shown in FIG. 1, the air blower device 10 is provided to an instrument panel 70. As with a typical vehicle, the instrument panel 70 is provided on the vehicle front side in the compartment, and a driver's seat 74 on which a driver 72 is seated and a front passenger seat on which an occupant 73 (see FIG. 11) is seated are provided on a vehicle rear side of the instrument panel 70 in the compartment. The driver's seat 74 is provided on a right side facing the vehicle front side, and the front passenger seat is provided on a left side facing the vehicle front side (see FIG. 11). In FIG. 1, an arrow DR1 indicates a vehicle front-rear direction DR1 and an arrow DR2 indicates a vehicle top-bottom direction (vehicle vertical direction) DR2. In FIG. 2 referred to below, an arrow DR3 indicates a vehicle right-left direction DR3, that is, a vehicle width direction DR3. The three directions DR1, DR2, and DR3 are directions orthogonal to one another.

As are shown in FIG. 1 and FIG. 2, the instrument panel 70 has a meter panel 76 including meters 761, such as a speedometer and a tachometer, and a meter hood 78 covering an upper side of the meter panel 76. FIG. 2 is a view of the meter panel 76 and the meter hood 78 when viewed from the driver 72 in a driving posture where a steering wheel 80 is omitted.

Besides the two meters 761, the meter panel 76 has a meter peripheral portion 762 forming a periphery of the meters 761. The meter panel 76 is provided in such a manner that the two meters 761 and the meter peripheral portion 762 are visible when the meter panel 76 is viewed from a side of the driver's seat 74.

The meter hood 78 is provided above (vehicle upper side) the meter panel 76 to spread in the vehicle width direction DR3 and is protruded to the vehicle rear side farther than the meter panel 76. Because the meter hood 78 is protruded to the vehicle rear side, the meter hood 78 has a hood rear end 781 located rearmost in the meter hood 78 on the vehicle rear side. The meter hood 78 has a hood bottom surface 782, and the hood bottom surface 782 extends diagonally downward to the vehicle front side from the hood rear end 781. The hood bottom surface 782 may be a smooth curved surface or may have a step.

As is shown in FIG. 1, the meter panel 76 and the meter hood 78 are provided in front of the driver's seat 74, in other words, on the vehicle front side of the driver's seat 74 in the compartment. A steering column 82 protrudes toward the driver's seat 74 from a portion of the instrument panel 70 below the meter panel 76. The steering wheel 80 is provided to a tip end of the steering column 82.

The steering wheel 80 is provided between the meter panel 76 and the driver's seat 74 in the vehicle front-rear direction DR1. That is, the steering wheel 80 is provided in front of the driver's seat 74 at a position closer to the driver's seat 74 than to the meter panel 76 and the meter hood 78. As with a typical vehicle steering wheel, the steering wheel 80 is of an annular shape about a center shaft of the steering column 82 facing diagonally upward to the vehicle rear side. A center position of the driver's seat 74, a center position of the meter panel 76, and a center position of the meter hood 78 fall on a center position CLs (see FIG. 2) of the steering wheel 80 in the vehicle width direction DR3.

Figure 3:
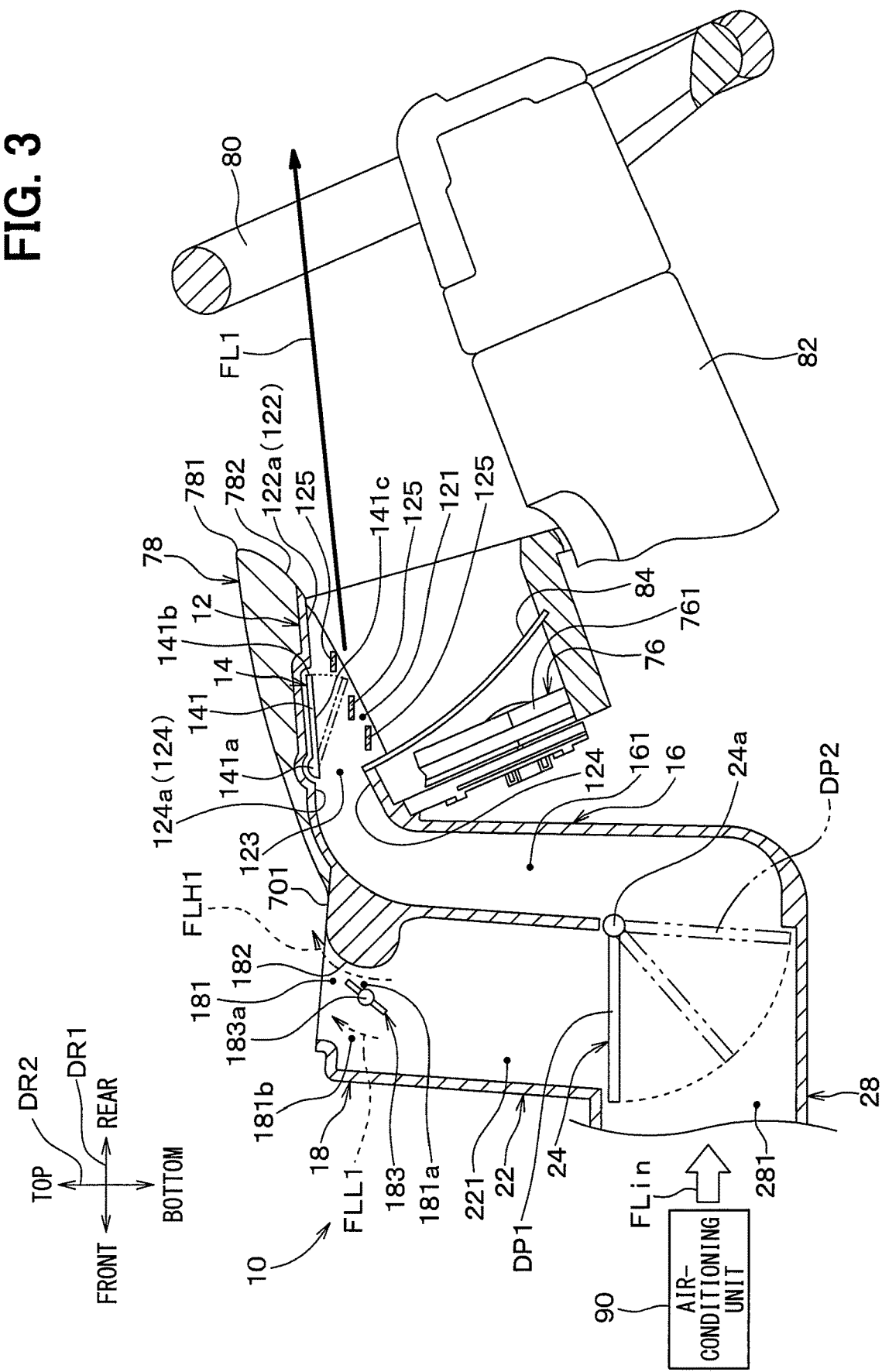
FIG. 3 is an enlarged detailed view of the air blower device and nearby components extracted from FIG. 1.

FIG. 3 is an enlarged detailed view of the air blower device 10 and nearby components extracted from FIG. 1. In FIG. 3, the air blower device 10 and the steering wheel 80 are shown in cross sections orthogonal to the vehicle width direction DR3 (see FIG. 2).

As is shown in FIG. 3, the air blower device 10 is a device which blows out air sent from the air-conditioning unit 90. In other words, the air-conditioning unit 90 functions as an air sending device which sends air to the air blower device 10. The air-conditioning unit 90 is a known device which is provided inside the instrument panel 70 (see FIG. 1) and blows out temperature-regulated air-conditioning air toward the compartment. For example, the air-conditioning unit 90 is same as an internal air-conditioning unit disclosed in JP-A-2013-082398.

As is shown in FIG. 3, the air blower device 10 includes a blow-out portion 12 which blows out air sent from the air-conditioning unit 90, a first outlet door 14, a first duct portion 16, another blow-out portion 18 which blows out air sent from the air-conditioning unit 90 in parallel with the blow-out portion 12, a second duct portion 22, and an air volume regulation door 24. Hereinafter, the blow-out portion 12 is referred to as the blow-out portion A 12, the blow-out portion 18 as the blow-out portion B 18, and the air volume regulation door 24 as the air volume regulation door A 24.

The blow-out portion A 12 is formed integrally with the meter hood 78 and the blow-out portion A 12 is provided with an outlet 121 which opens to blow out air sent from the air-conditioning unit 90 to the vehicle rear side. To be more specific, the outlet 121 opens in the hood bottom surface 782 of the meter hood 78. The outlet 121 is provided on the vehicle rear side of an upper end of a transparent meter window 84 provided on the vehicle rear side of the meter panel 76. Hereinafter, the outlet 121 is referred to as the outlet A 121.

Furthermore, the outlet A 121 opens to blow out air sent from the air-conditioning unit 90 to the vehicle rear side through an inner side of the steering wheel 80 as is indicated by an arrow FL1. The arrow FL1 represents a mainstream of the air blown out from the outlet A 121. It is sufficient that the mainstream of the air arrives a driver through the inner side of the steering wheel 80, and it is not necessary for the entire air to pass through the inner side of the steering wheel 80.

The meter window 84 is, for example, a transparent acrylic board as so-called a nonreflectable board reducing reflection of light to the driver 72 (see FIG. 1). The meter window 84 is bottom-warped by positioning a lower end of the meter window 84 more on the vehicle rear side than an upper end. The bottom-warped meter window 84 makes the blow-out portion A 12 easier to mount.

More specifically, as are shown in FIG. 2 and FIG. 3, the outlet A 121 opens in the hood bottom surface 782 while facing the vehicle rear side and is formed symmetrically in the vehicle width direction DR3 with respect to the center position CLs of the steering wheel 80. For example, the outlet A 121 opens thin in the vehicle top-bottom direction DR2 while spreading in the vehicle width direction DR3. The blow-out portion A 12 is thus capable of blowing an airflow symmetrical in the vehicle width direction DR3 about the center position CLs of the steering wheel 80 toward the driver 72.

As is shown in FIG. 3, the blow-out portion A 12 defines a blow-out air passage 123 extending from the outlet A 121 to the vehicle front side. Air sent from the air-conditioning unit 90 flows into the blow-out air passage 123 and the air flowing into the blow-out air passage 123 flows to the outlet A 121.

That is, the blow-out portion A 12 has an outlet rim portion 122 forming a rim of the outlet A 121, and a passage inner wall surface 124 surrounding and thereby defining the blow-out air passage 123. The passage inner wall surface 124 extends from the outlet rim portion 122 to the vehicle front side. Further, the passage inner wall surface 124 inclines in such a manner that a front side of the passage inner wall surface 124 in the vehicle front-rear direction DR1 is lowered with respect to a rear end. More specifically, the passage inner wall surface 124 is provided in such a manner that an upper portion 124a of the passage inner wall surface 124 extends diagonally downward to the vehicle front side from an upper portion 122a of the outlet rim portion 122. In other words, the passage inner wall surface 124 is provided in such a manner that the upper portion 124a of the passage inner wall surface 124 extends diagonally upward to the vehicle rear side toward the upper portion 122a of the outlet rim portion 122.

In addition, the blow-out portion A 12 has multiple outlet ribs 125 each formed in a thin plate shape. Given that a direction orthogonal to a flow direction (see the arrow FL1) of air blown out from the outlet A 121 is a thickness direction, then each outlet rib 125 is provided inside the outlet A 121 to lie across the outlet A 121 in the vehicle width direction DR3. Owing to such a configuration, the outlet ribs 125 restrict foreign matter from coming into the blow-out portion A 12 through the outlet A 121 while avoiding an interference with an airflow blown out from the outlet A 121.

The first outlet door 14 is a blowing direction regulation device which is provided to the blow-out portion A 12 and regulates a blowing direction of air blown out from the outlet A 121. A blowing direction of air blown out from the outlet A 121 is, for example, a direction indicated by the arrow FL1 in FIG. 3.

To be more specific, the first outlet door 14 has an air guiding member 141 in a flat plate shape. The air guiding member 141 is provided to spread substantially both in the vehicle front-rear direction DR1 and the vehicle width direction DR3. The air guiding member 141 has a front end 141a at an end of the air guiding member 141 on the vehicle front side. The first outlet door 14 regulates the blowing direction with rotational motion of the air guiding member 141, and the front end 141a of the air guiding member 141 is a rotation center of the air guiding member 141.

The air guiding member 141 rotates only slightly in a horizontal direction of the air guiding member 141. For example, the air guiding member 141 rotates under electrical control of an unillustrated electronic control unit within a rotatable range from an upper position at which the air guiding member 141 is indicated in FIG. 3 by a solid line to a lower position at which the air guiding member 141 is indicated by an alternate long and two short dashes line. Hence, when the air guiding member 141 rotates about the front end 141a, a rear end 141b on an opposite side to the front end 141a in the vehicle front-rear direction DR1 moves up and down.

The air guiding member 141 is provided on relatively an upper side in the blow-out air passage 123. In other words, the air guiding member 141 is provided in such a manner that at least a part of the air guiding member 141 is situated in an upper region of the blow-out air passage 123. The upper region of the blow-out air passage 123 represents a region of the blow-out air passage 123 upper than a center of the blow-out air passage 123 in a top-bottom direction. More specifically, a part of the upper portion 124a of the passage inner wall surface 124 is recessed upward and the air guiding member 141 is provided in such a manner that the air guiding member 141 at the upper position is fit in the recessed portion. For example, when the air guiding member 141 is at the upper position at which the rear end 141b of the air guiding member 141 is positioned uppermost, the air guiding member 141 is at rest along the upper portion 124a of the passage inner wall surface 124 as is shown in FIG. 3.

In particular, the air guiding member 141 is provided in such a manner that the air guiding member 141 is entirely situated in the upper region of the blow-out air passage 123 as an example.

Figure 4:
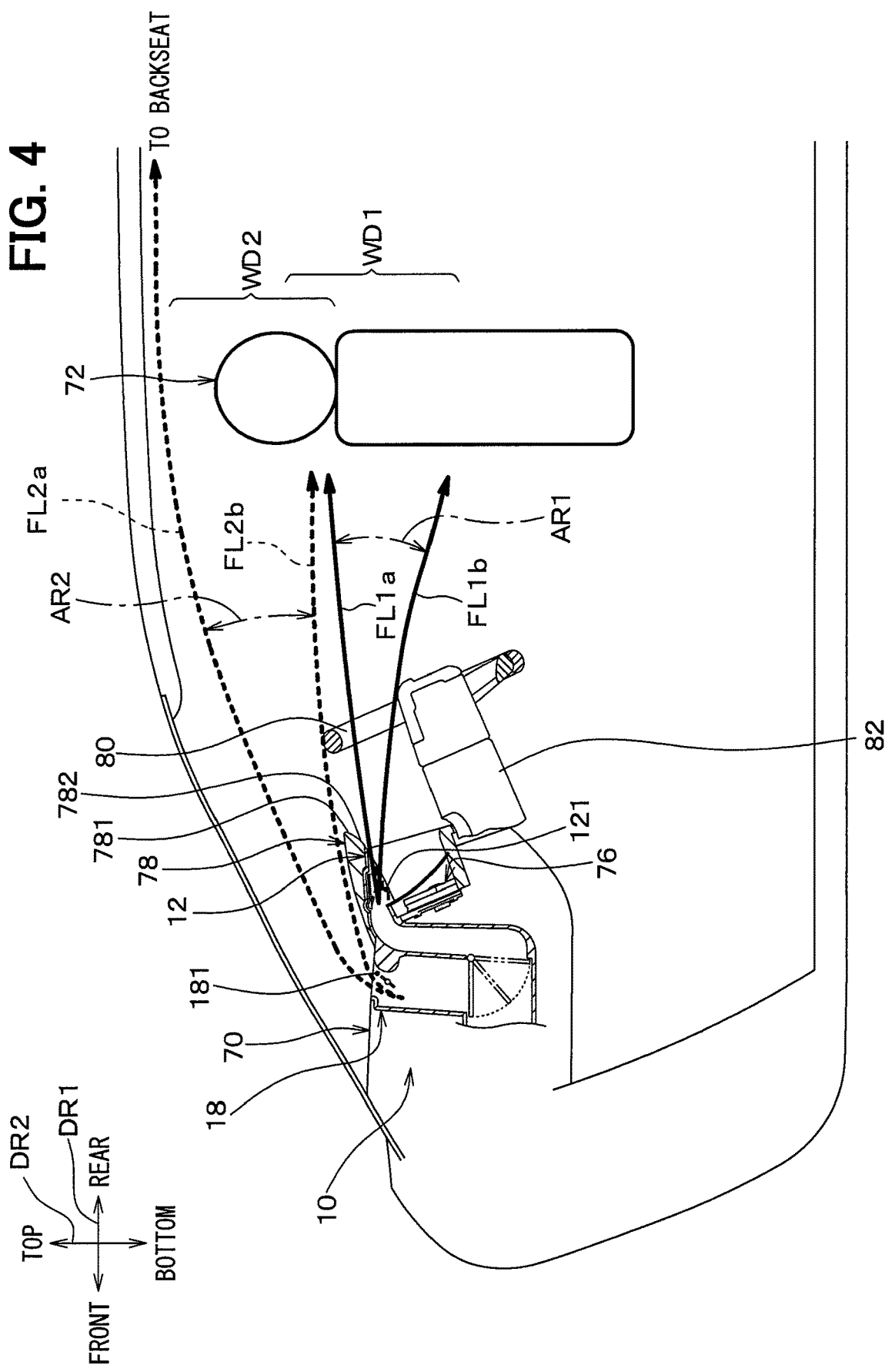
FIG. 4 is a side view same as FIG. 1 showing an air sending range of air which the air blower device blows out into the compartment.

Hence, a lower plane of the air guiding member 141, that is, a bottom surface 141c forms an air guiding surface 141c along which air blown out from the outlet A 121 flows. That is, the first outlet door 14 regulates a blowing direction of air blown out from the outlet A 121 by changing an angle of the bottom surface 141c functioning as the air guiding surface 141c. More specifically, by rotating about the front end 141a, the air guiding member 141 regulates a blowing direction of air blown out from the outlet A 121 up and down as is indicated by an arrow AR1 of FIG. 4. For example, air from the outlet A 121 is regulated by the first outlet door 14 and sent within a wind direction range WD1 from a face to a periphery around a stomach of the driver 72. FIG. 4 is a side view same as FIG. 1 and shows an air sending range of air which the air blower device 10 blows out into the compartment. An arrow FL1a indicates an airflow flowing in an uppermost tier in the air sending range (blow-out range) of the blow-out portion A 12. An arrow FL1b indicates an airflow flowing in a lowermost tier in the air sending range of the blow-out portion A 12. Hereinafter, the air guiding surface 141c is referred to as the air guiding surface A 141c.

Figure 5:
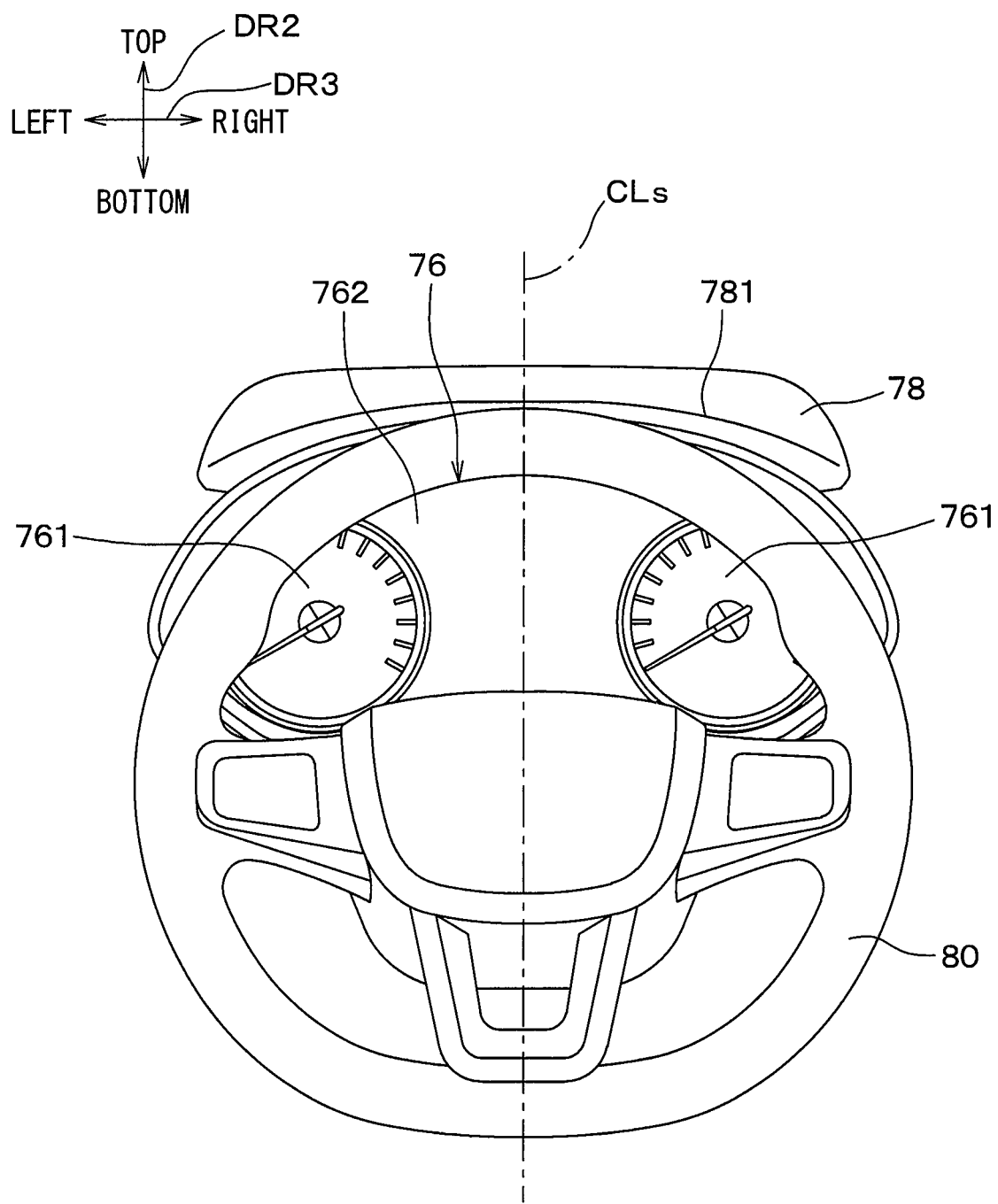
FIG. 5 is a view of the meter panel, the meter hood, and the steering wheel of the first embodiment when viewed from the driver in a driving posture.

As is shown in FIG. 5, the first outlet door 14 is invisible to the driver 72 (see FIG. 1) in a driving posture no matter where within the rotatable range from the upper position to the lower position where the first outlet door 14 is located. For example, the outlet A 121 and the first outlet door 14 rotating inside the outlet A 121 are provided to hide behind the steering wheel 80 and the meter hood 78 when viewed from a head rest 741 (see FIG. 1) supporting back of a head of the driver 72 and forming an upper end of the driver's seat 74. FIG. 5 is a view of the meter panel 76, the meter hood 78, and the steering wheel 80 when viewed from the driver 72 in a driving posture.

As is shown in FIG. 3, the blow-out portion B 18 is an air blow-out portion which blows out air sent from the air-conditioning unit 90 in parallel with the blow-out portion A 12. The blow-out portion B 18 is formed integrally with the blow-out portion A 12 and provided on the vehicle front side of the blow-out portion A 12. In short, the blow-out portion B 18 is provided on the vehicle front side of the meter hood 78.

The blow-out portion B 18 is provided with an outlet 181 from which air sent from the air-conditioning unit 90 is blown out in parallel with the outlet A 121. The outlet 181 opens faced up and is provided more on the front side than the outlet A 121. The outlet 181 is formed symmetrically (see FIG. 11) in the vehicle width direction DR3 with respect to the center position CLs of the steering wheel 80. The blow-out portion B 18 is thus capable of blowing an airflow symmetrical in the vehicle width direction DR3 about the center position CLs of the steering wheel 80 toward the driver 72. Hereinafter, the outlet 181 is referred to as the outlet B 181.

The blow-out portion B 18 changes a direction of an airflow blown out from the outlet B 181 in accordance with the same principle underlying an air blower device disclosed in JP-A-2014-210564. In short, the blow-out portion B 18 changes a direction of an airflow to blow out the airflow toward the vehicle rear side by using the Coanda effect.

To be more specific, as is shown in FIG. 3, the blow-out portion B 18 has an air guiding surface 182 to change a direction of an airflow to blow out the airflow toward the vehicle rear side. The air guiding surface 182 is an outlet rear surface forming a portion of the outlet B 181 on the vehicle rear side. The air guiding surface 182 is a curved surface of a protruding shape in cross section when viewed in the vehicle width direction DR3 (see FIG. 2), that is, in a cross section shown in FIG. 3. To be more specific, the air guiding surface 182 curves in such a manner that an airflow downstream side of the air guiding surface 182 warps to the vehicle rear side with respect to an airflow upstream side. The air guiding surface 182 smoothly continues to an upper surface 701 of the instrument panel 70 at an airflow downstream end of the air guiding surface 182. Hereinafter, the air guiding surface 182 is referred to as the air guiding surface B 182.

Also, the blow-out portion B 18 has a second outlet door 183. The second outlet door 183 is a rotary door in a flat plate shape provided inside the outlet B 181 and rotating about a center shaft 183a extending in the vehicle width direction DR3. The second outlet door 183 rotates under electrical control of the electronic control unit.

The second outlet door 183 increases and decreases a passage sectional area of a rear-side air passage 181a defined between the second outlet door 183 and the air guiding surface B 182 in the outlet B 181 with rotational motion of the second outlet door 183. By narrowing down the rear-side air passage 181a in the manner as above, the second outlet door 183 raises a flow velocity of an airflow passing through the rear-side air passage 181a to change the accelerated airflow to a high-speed airflow FLH1 which bends along the air guiding surface B 182 due to the Coanda effect.

Air also flows through a front-side air passage 181b which is defined more on the vehicle front side than the second outlet door 183 in the outlet B 181. It should be noted, however, that an airflow passing through the front-side air passage 181b forms a low-speed airflow FLL1 slower than the high-speed airflow FLH1 passing through the rear-side air passage 181a and is therefore drawn to the high-speed airflow FLH1. Consequently, air passing through the front-side air passage 181b flows to the vehicle rear side with air passing through the rear-side air passage 181a as is indicated by an arrow FL2 (see FIG. 1).

The blow-out portion B 18 uses the Coanda effect as above and forces air blown out from the outlet B 181 to head to the vehicle rear side by causing the air to flow along the air guiding surface B 182 while forming the airflow heading to the vehicle rear side above the steering wheel 80 as is indicated by the arrow FL2.

As is shown in FIG. 4, a blowing direction of air blown out from the outlet B 181 is regulated up and down as is indicated by an arrow AR2 according to a flow rate of air flowing into the blow-out portion B 18 and a rotational angle of the second outlet door 183. For example, air from the outlet B 181 is regulated by the second outlet door 183 and sent within a wind direction range WD2, which is a range from the head to a periphery of a throat of the driver 72 plus a face of an occupant seated in a backseat. In FIG. 4, an arrow FL2a indicates an airflow flowing in an uppermost tier in the air sending range of the blow-out portion B 18, and an arrow FL2b indicates an airflow flowing in a lowermost tier in the air sending range of the blow-out portion B 18.

When a passage sectional area of the rear-side air passage 181a is reduced by the second outlet door 183 and a flow velocity of the high-speed airflow FLH1 (see FIG. 3) passing through the rear-side air passage 181a rises, a blowing direction of air from the outlet B 181 changes from a direction indicated by the arrow FL2a to a direction indicated by the arrow FL2b.

As is indicated by the arrow FL2a of FIG. 4, the blow-out portion B 18 is also capable of blowing out air in such a manner that air blown out from the outlet B 181 arrives the backseat over the head of the driver 72 within the air sending range of the blow-out portion B 18. For example, by blowing out air in a blowing direction indicated by the arrow FL2a, the blow-out portion B 18 becomes capable of blowing out air arriving the backseat.

Referring to FIG. 3 again, the first duct portion 16 is an intermediate duct portion interposed between the blow-out portion A 12 and the air volume regulation door A 24. That is, the first duct portion 16 defines a first duct passage 161 which is an air passage where air sent from the air-conditioning unit 90 flows. The first duct passage 161 is provided upstream of the blow-out air passage 123 of the blow-out portion A 12 in a flow of air. Consequently, air sent from the air-conditioning unit 90 flows into the first duct passage 161, and the air flowing into the first duct passage 161 flows to the blow-out air passage 123 in the first duct portion 16.

The second duct portion 22 is interposed between the blow-out portion B 18 and the air volume regulation door A 24. The second duct portion 22 defines a second duct passage 221 which is an air passage where air sent from the air-conditioning unit 90 flows.

That is, the two duct portions 16 and 22 are connected to an airflow downstream end of an upstream duct portion 28, in which air sent from the air-conditioning unit 90 flows as indicated by an arrow FLin and which is provided upstream of the air volume regulation door A 24 in a flow of air. One of the two duct portions 16 and 22 is the first duct portion 16 and the other is the second duct portion 22. An upstream air passage 281 defined in the upstream duct portion 28 branches to the first duct passage 161 and the second duct passage 221 at a position where the air volume regulation door A 24 is provided.

Each of the first duct portion 16 and the second duct portion 22 is provided for air to flow from bottom to top and provided on the vehicle front side of the meter panel 76. In other words, the first duct portion 16 and the second duct portion 22 are provided to overlap each other on the vehicle front side of the meter panel 76.

As to a relation of the first duct portion 16 and the second duct portion 22, for example, the first duct portion 16 and the second duct portion 22 together form a singular resin duct member. The second duct portion 22 is provided on the vehicle front side of the first duct portion 16.

The air volume regulation door A 24 is an air volume regulation device which regulates an air volume ratio of a volume of air blown out from the outlet A 121 and a volume of air blown out from the outlet B 181. As is shown in FIG. 3, the air volume regulation door A 24 is provided at a connection position of the upstream air passage 281 to the first duct passage 161 and the second duct passage 221.

To be more specific, the air volume regulation door A 24 is a rotary door in a flat plate shape rotational about a center shaft 24a extending in the vehicle width direction DR3. The air volume regulation door A 24 rotates under electrical control of the electronic control unit.

The air volume regulation door A 24 increases and decreases an opening area at an inlet of the first duct passage 161 and an opening area at an inlet of the second duct passage 221 according to a rotational position of the air volume regulation door A 24. The air volume regulation door A 24 regulates the air volume ratio by increasing and decreasing the opening areas. The air volume regulation door A 24 continuously rotates within a rotatable range from a first position DP1 to a second position DP2. The first position DP1 is a position at which the air volume regulation door A 24 fully opens the inlet of the first duct passage 161 while fully closing the inlet of the second duct passage 221. The second position DP2 is a position at which the air volume regulation door A 24 fully opens the inlet of the second duct passage 221 while fully closing the inlet of the first duct passage 161. For example, when the air volume regulation door A 24 is positioned at an intermediate position between the first position DP1 and the second position DP2, air sent inside can be blown out from both of the blow-out portion A 12 and the blow-out portion B 18.

A wind velocity of air blown out from the blow-out portion A 12 rises as a flow rate of air flowing into the first duct passage 161 increases, and a wind velocity of air blown out from the blow-out portion B 18 rises as a flow rate of air flowing into the second duct passage 221 increases. The air volume regulation door A 24 is thus capable of changing a difference in wind velocity generated between the airflow FL1 (referred to as the first airflow FL1) blown out from the outlet A 121 and the airflow FL2 (referred to as the second airflow FL2) blown out from the outlet B 181.

Figure 6:
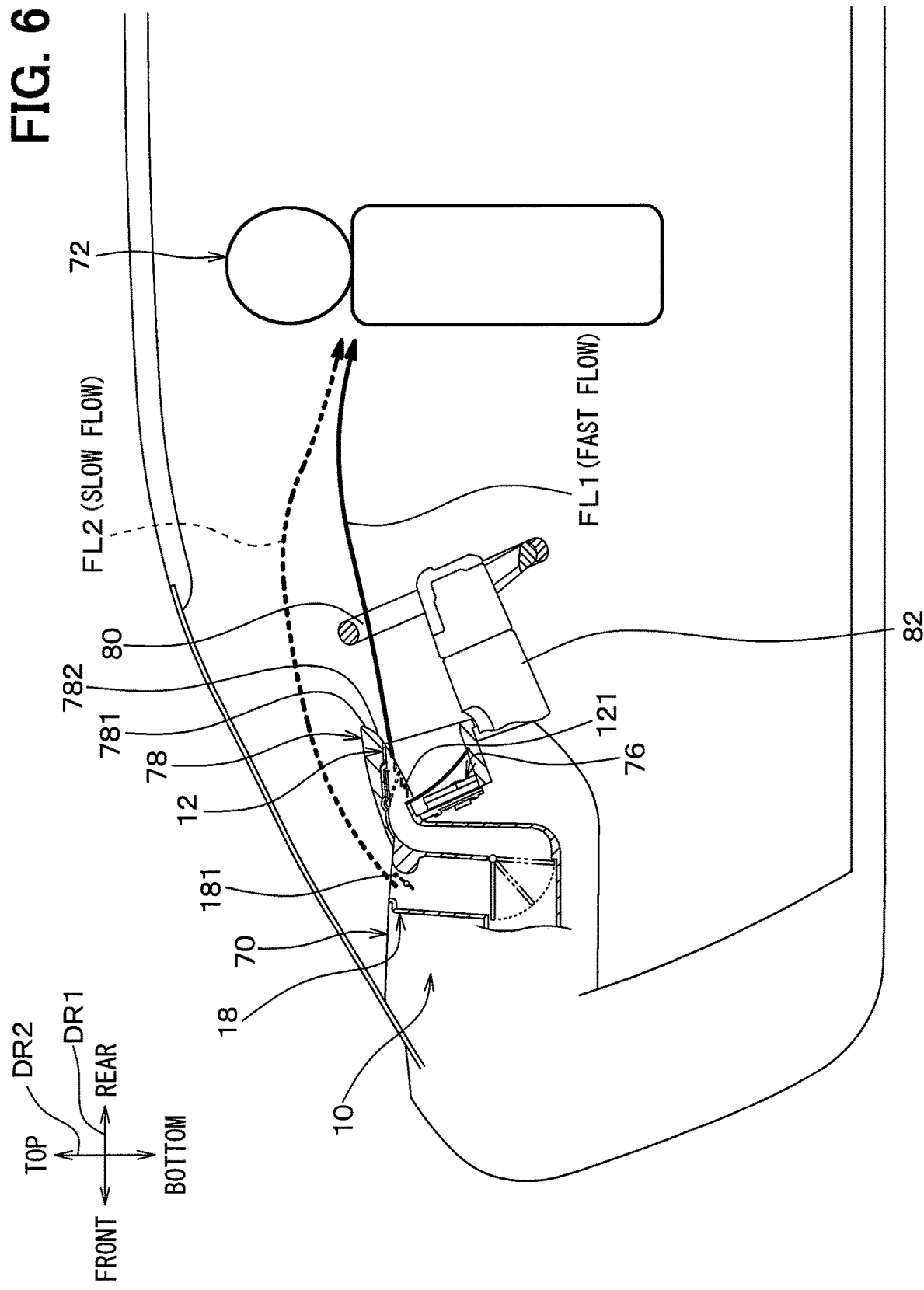
FIG. 6 is a view showing flows of air which the air blower device of the first embodiment blows out into the compartment and schematically showing a manner in which a second airflow from an outlet B is drawn to a first airflow from an outlet A.

As is shown in FIG. 6, when a wind velocity of the second airflow FL2 is lower than a wind velocity of the first airflow FL1 and the two airflows FL1 and FL2 are close to each other, the slower second airflow FL2 is drawn to the faster first airflow FL1 due to the Coanda effect. Hence, by positioning the air volume regulation door A 24 at a predetermined position within the rotatable range of the air-volume regulation door A 24, the airflows FL1 and FL2 as are shown in FIG. 6 can be created. That is, the air volume regulation door A 24 regulates an air volume ratio of air blown out from the outlet A 121 and air blown out from the outlet B 181 in such a manner that a wind velocity of the second airflow FL2 becomes lower than a wind velocity of the first airflow FL1 and the first airflow FL1 and the second airflow FL2 generate a difference in wind velocity, with which the second airflow FL2 is drawn to the first airflow FL1. FIG. 6 is a view showing a state of airflows the air blower device 10 blows out into the compartment and schematically showing a manner in which the second airflow FL2 from the outlet B 181 is drawn to the first airflow FL1 from the outlet A 121.

Figure 7:
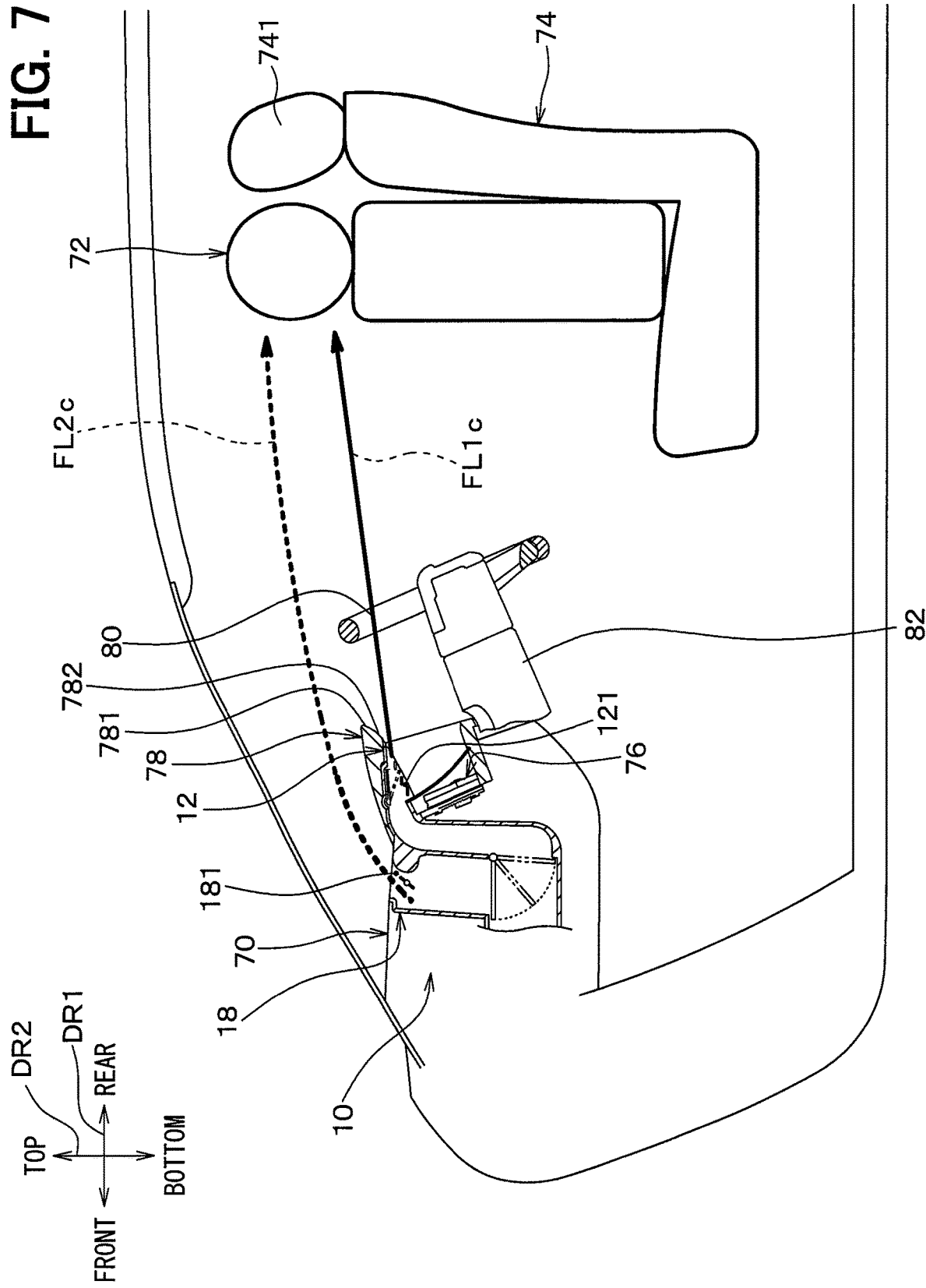
FIG. 7 is a view schematically showing airflows which the air blower device blows out into the compartment during a cool-down in the first embodiment.
Figure 8:
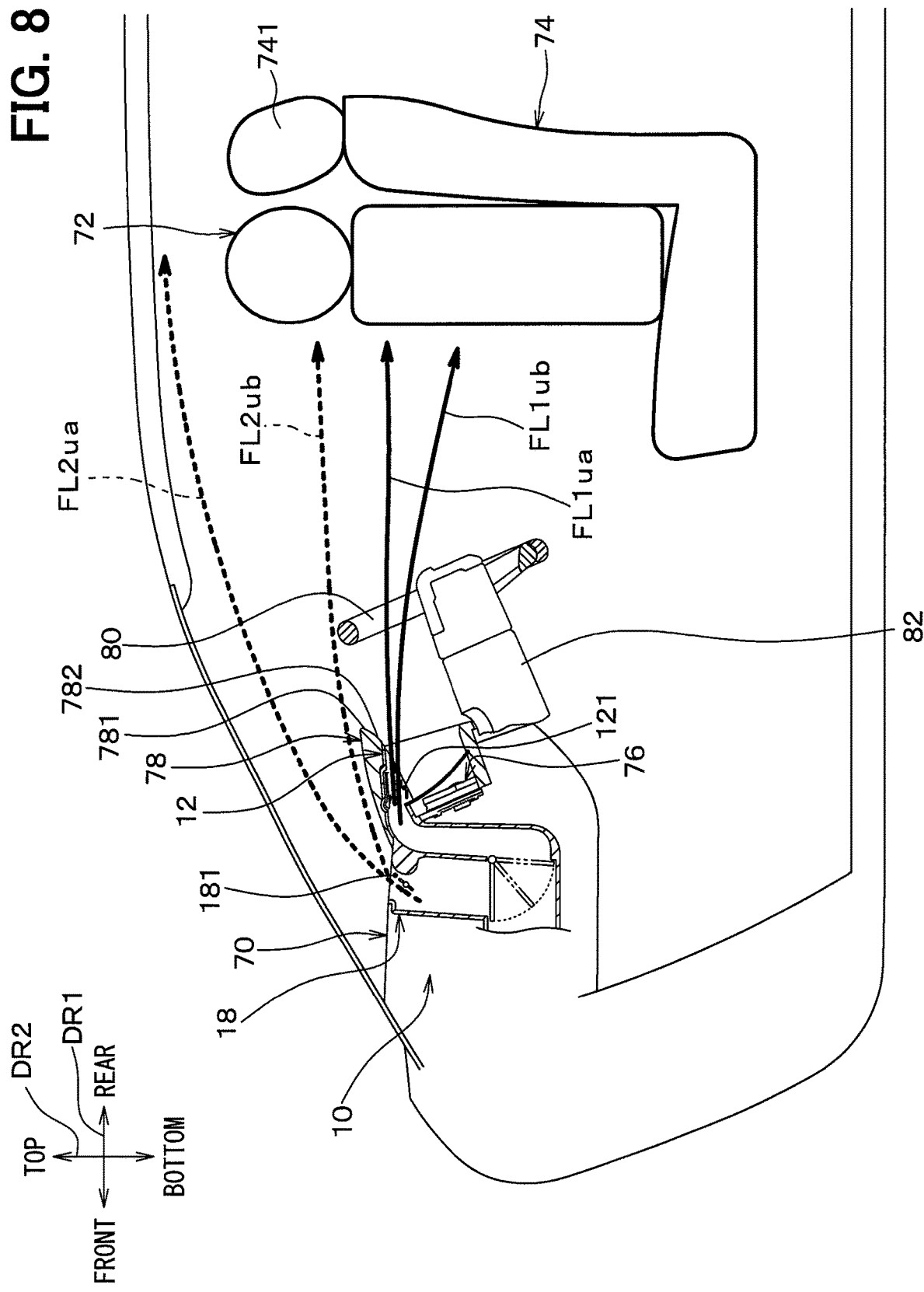
FIG. 8 is a view schematically showing airflows which the air blower device blows out into the compartment during a steady operation in the first embodiment.

According to the air blower device 10 configured as above, as are indicated by arrows FL1c and FL2c of FIG. 7, a large volume of cold air from the air-conditioning unit 90 can be blown out locally from the face to the throat of the driver 72, for example, during a cool-down by which heat is removed quickly. During a steady operation by which cooling in the compartment is continued to maintain an existing state, as are indicated by arrows FL1ua, FL1ub, FL2ua, and FL2ub of FIG. 8, a wind direction can be regulated as the driver 72 desires by operations of the first outlet door 14 and the second outlet door 183 (see FIG. 3). FIG. 7 is a view schematically showing airflows the air blower device 10 blows out into the compartment during a cool-down. FIG. 8 is a view schematically showing airflows the air blower device 10 blows out into the compartment during a steady operation.

In the present embodiment, as is shown in FIG. 3, the blow-out portion A 12 is provided with the outlet A 121, and the outlet A 121 opens in the meter hood 78 to blow out air from the air-conditioning unit 90 to the vehicle rear side through the inner side of the steering wheel 80. Hence, as is shown in FIG. 2, air can be blown out from the outlet A 121 which opens wide in a neighborhood of the driver 72. Consequently, a sufficient volume of air can be blown out to the driver 72 from in front of the driver 72.

For example, the display unit for a vehicle described in Patent Literature 1 has an outlet in the meter and hence a size of the outlet is limited. On the contrary, in the present embodiment, a larger size can be readily secured for the outlet A 121 in comparison with the counterpart in the display unit for a vehicle described in Patent Literature 1. Hence, an airflow can be blown out from the outlet A 121 while reducing a diffusion loss. Consequently, an instant cooling effect can be increased by improving arrival performance of cold air to the driver 72 during a cooling operation. In short, the outlet A 121 can be opened wider easily and hence sending of a large volume of air can be readily created.

As is shown in FIG. 3, the first outlet door 14 regulates a blowing direction of air blown out from the outlet A 121 by changing an angle of the air guiding surface A 141c. Hence, a blowing direction of air blown out from the outlet A 121 can be regulated while ensuring a large volume of air. Consequently, air from the outlet A 121 can be blown to the driver 72 over a wide range (for example, the wind direction range WD1 of FIG. 4) instead of blowing air from the outlet A 121 to the driver 72 only in a local portion.

Also, by regulating the first outlet door 14, air blown out from the outlet A 121 can be restricted from heading toward the eyes of the driver 72. Hence, the face or the head of the driver 72 can be cooled more quickly without impairing comfortability of the driver 72.

As to the display unit for a vehicle described in Patent Literature 1, the display unit for a vehicle described in Patent Literature 1 is not furnished with a function of regulating a direction of an airflow sent from inside the meter. Hence, the airflow is highly likely to strike on an obstacle, such as the steering wheel and the steering column. Moreover, when the airflow flows near the obstacle, the Coanda effect is exerted, due to which the airflow bends. It is therefore well anticipated that the airflow is hard to control.

Figure 10:
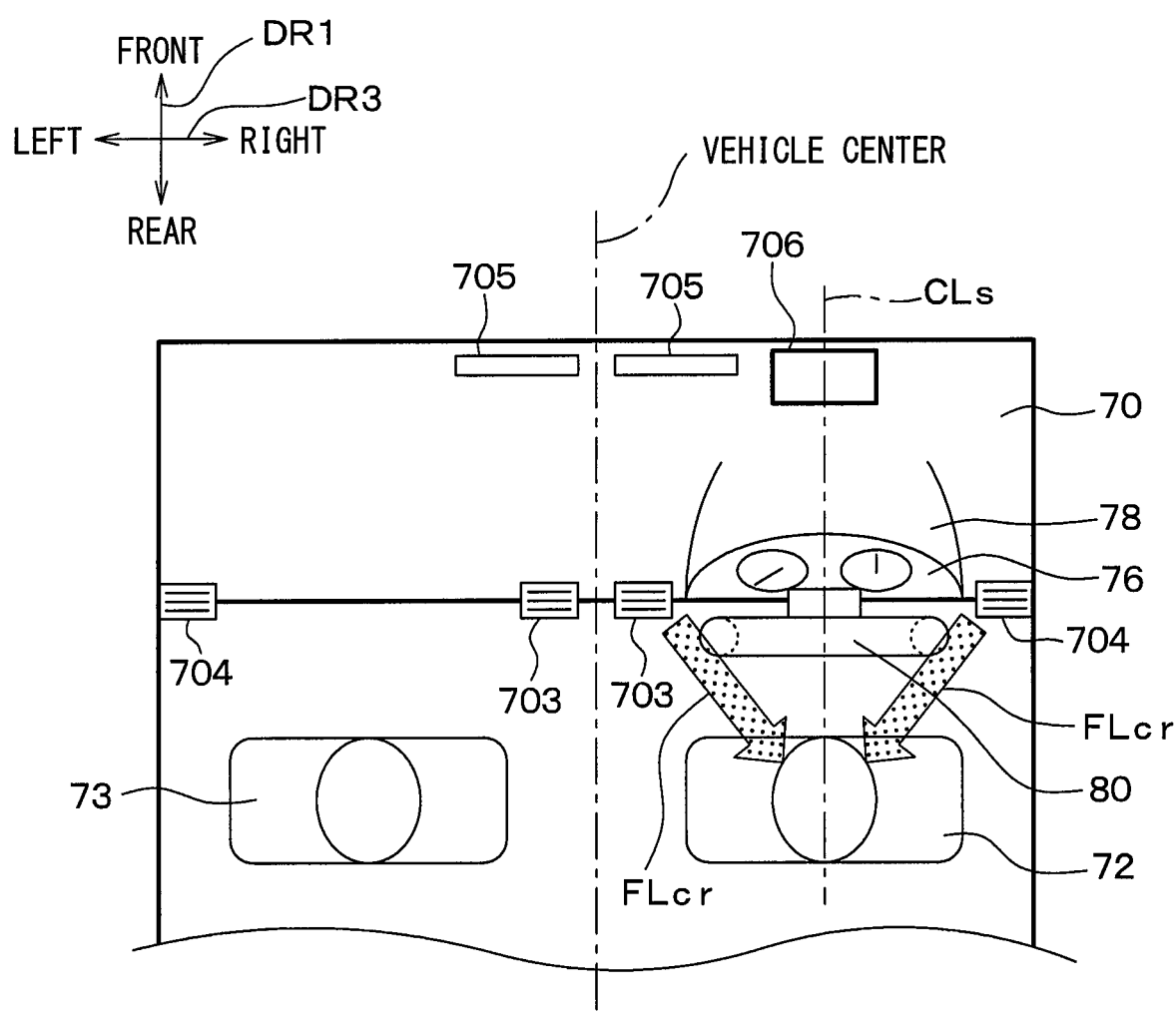
FIG. 10 is a schematic view of a vehicle front portion in a compartment in a comparative example compared with the first embodiment when viewed from above a vehicle.

As is shown by the comparative example of FIG. 10, when airflows are blown to the driver 72 as are indicated by arrows FLcr from a center face opening 703 and a side face opening 704, which are air outlets of a typical air-conditioning unit, it is difficult for airflows blown out as above to avoid an obstacle, such as the steering wheel 80. The airflows thus strike on the obstacle and a diffusion loss is generated. Further, because the airflows blown out as above bend along a surface of the obstacle due to the Coanda effect, the airflows are quite hard to control. FIG. 10 is a schematic view of a vehicle front part in the compartment in the comparative example compared with the present embodiment when viewed from above the vehicle. In FIG. 10, besides the center face opening 703 and the side face opening 704, a defroster opening 705 and a HUD (head-up display) device 706 are provided to the instrument panel 70.

Figure 11:
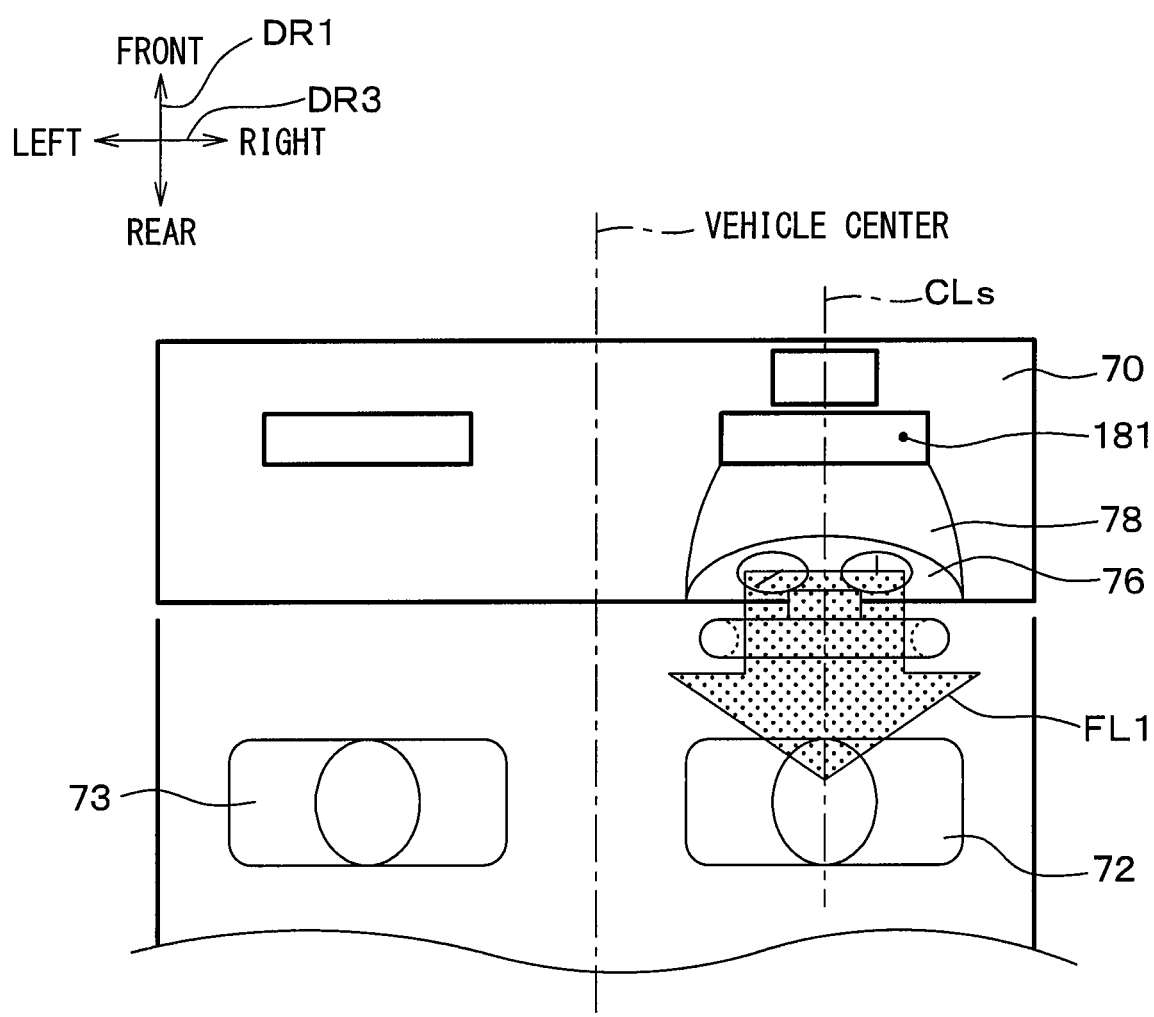
FIG. 11 is a schematic view of a vehicle front portion in the compartment in the first embodiment when viewed from above the vehicle.

In contrast, in the present embodiment, as is indicated by an arrow FL1 of FIG. 11, air can be sent from the outlet portion A 12 (see FIG. 3) linearly through the inner side of the steering wheel 80 over a distance shorter than the airflows from the center face opening 703 and the side face opening 704 (see FIG. 10). Hence, the driver 72 can be cooled more quickly during a cooling operation by reducing influences of a diffusion loss of an airflow at an obstacle and bending of an airflow due to the Coanda effect to a least possible extent. FIG. 11 is a schematic view of a vehicle front part in the compartment in the present embodiment when viewed from above the vehicle.

In the present embodiment, as are shown in FIG. 2 and FIG. 3, the hood bottom surface 782 of the meter hood 78 is provided below the hood rear end 781 and extends diagonally downward to the vehicle front side. The outlet A 121 opens in the hood bottom surface 782 and faces the vehicle rear side. Hence, air can be sent directly to the driver 72 from the outlet A 121 while the outlet A 121 is not directly visible to the driver 72 in a driving posture by hiding behind the steering wheel 80 and the meter hold 78. Hence, the air blower device 10 of the present embodiment excels in design in comparison with the display unit for a vehicle described in Patent Literature 1 having the outlet directly visible to the eyes of the driver 72.

Figure 9:
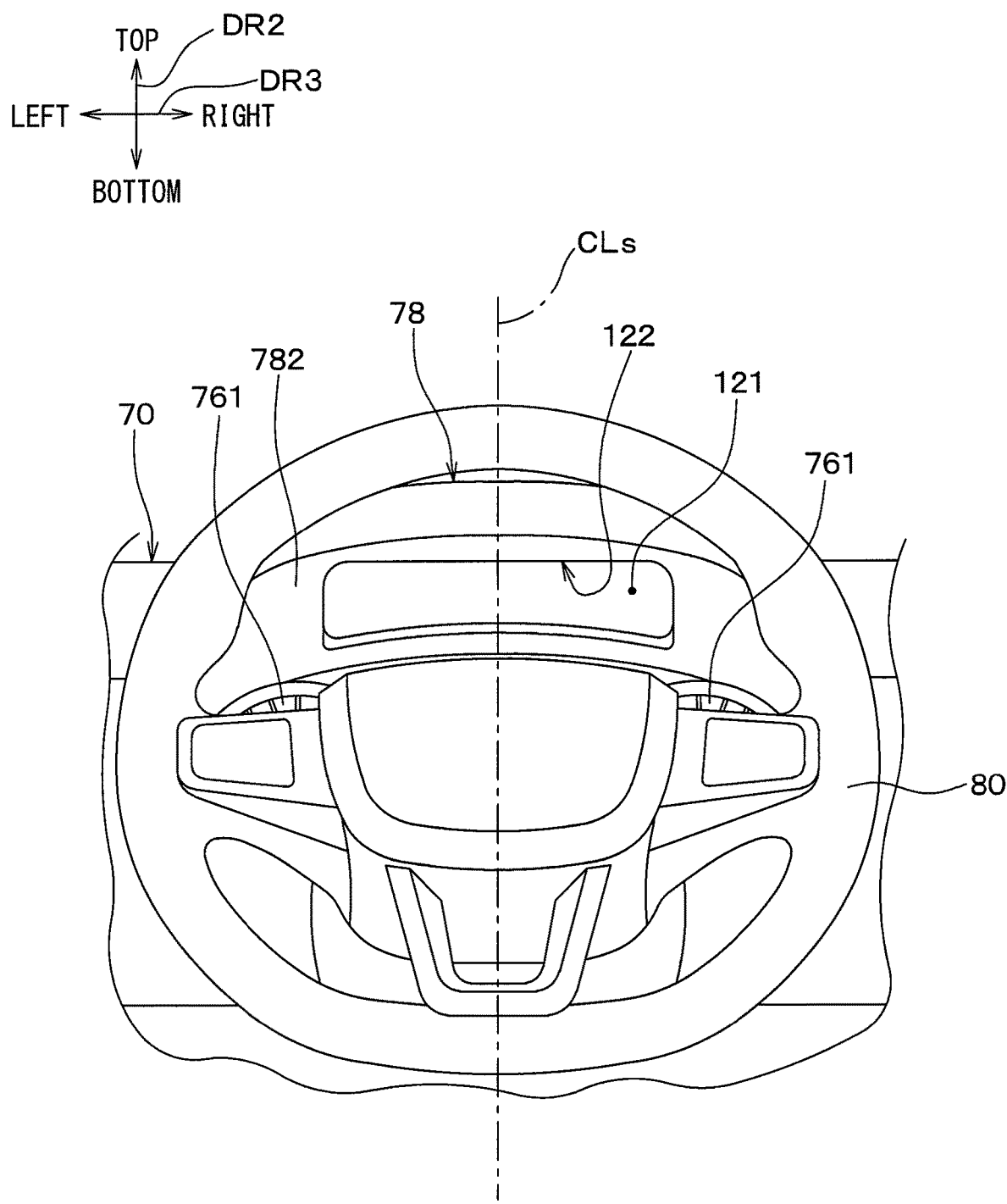
FIG. 9 is a view of the meter panel, the meter hood, and the steering wheel when peered under the steering wheel from a driver's seat in the first embodiment.

The outlet A 121 is visually recognized as in FIG. 9 when peered under the steering wheel 80 from the driver's seat 74. However, an occupant seldom sees an object in such a manner normally and no design issue arises. FIG. 9 is a view of the meter panel 76, the meter hood 78, and the steering wheel 80 when peered under the steering wheel 80 from the driver's seat 74.

As is shown in FIG. 3, the hood bottom surface 782 where the outlet A 121 opens is a surface extending diagonally downward to the vehicle front side below the hood rear end 781. Such a configuration has an advantage that the outlet A 121 hiding behind the meter hood 78 is invisible to the eyes of the driver 72 in a driving posture and foreign matter hardly comes into the outlet A 121 in comparison with a configuration in which the outlet A 121 opens in a face-up surface.

In the present embodiment, the air guiding member 141 of the first outlet door 14 is provided relatively on the upper side in the blow-out air passage 123. In other words, the air guiding member 141 is provided in such a manner that at least a part of the air guiding member 141 is situated in the upper region of the blow-out air passage 123. Hence, a blowing direction of air blown out from the outlet A 121 can be regulated by the first outlet door 14 while making the first outlet door 14 invisible to the eyes of the driver 72 in a driving posture. In the present embodiment, in particular, the air guiding member 141 is provided in such a manner that the air guiding member 141 is entirely situated in the upper region of the blow-out air passage 123. Hence, the first outlet door 14 is particularly made invisible to the eyes of the driver 72 in a driving posture.

In the present embodiment, the passage internal wall surface 124 of the blow-out portion A 12 is provided in such a manner that the upper portion 124a of the passage inner wall surface 124 extends diagonally downward to the vehicle front side from the upper portion 122a of the outlet rim portion 122. In other words, the passage inner wall surface 124 of the blow-out portion A 12 is provided in such a manner that the upper portion 124a of the passage inner wall surface 124 extends diagonally upward to the vehicle rear side toward the upper portion 122a of the outlet rim portion 122. The blow-out portion A 12 is thus capable of raising an upper limit of the air sending range (that is, the wind direction range WD1 of FIG. 4) of the blow-out portion A 12 in comparison with a configuration in which the upper portion 124a of the passage inner wall surface 124 extends, for example, horizontally. For example, in the present embodiment, the upper limit is raised to a periphery of the face of the driver 72.

In the present embodiment, the first duct portion 16 is provided on the vehicle front side of the meter panel 76. Hence, for example, by forming the blow-out portion A 12 and the first duct portion 16 integrally with the meter panel 76, the three components can be made into one unit easily.

In the present embodiment, the outlet ribs 125 are provided to lie across the outlet A 121 while avoiding an interference with an airflow blown out from the outlet A 121 and restrict foreign matter from coming into the blow-out portion A 12 through the outlet A 121. Hence, foreign matter can be restricted from coming inside the air blower device 10.

Because the outlet ribs 125 are provided inside the outlet A 121, foreign matter coming inside can be restricted without giving an influence to visibility of the meters 761 and the like in the meter panel 76 to the driver 72.

In the present embodiment, as are shown in FIG. 2 and FIG. 11, each of the outlet A 121 and the outlet B 181 is formed symmetrically in the vehicle width direction DR3 with respect to the center position CLs of the steering wheel 80. Hence, an airflow blown out from the air blower device 10 can be maintained in balance symmetrically about the driver 72. Consequently, air can be sent directly to the driver 72 while ensuring comfortability of the driver 72.

In the present embodiment, as is shown in FIG. 4, the blow-out portion B 18 forms an airflow heading to the vehicle rear side above the steering wheel 80. Hence, an airflow made up of two layers split at the meter hood 78 in the vehicle top-bottom direction DR2 and superimposed in the vehicle top-bottom direction DR2 is formed.

Air from the blow-out portion B 18 forming an upper airflow in the two-layer airflow is chiefly sent to a periphery of the face of the driver 72. The blow-out portion B 18 is also capable of sending air to the backseat over the head of the driver 72. Meanwhile, air from the blow-out portion A 12 forming a lower airflow in the two-layer airflow can be sent to the face and an entire chest of the driver 72, and is chiefly sent to a vicinity of the chest of the driver 72.

By using both of the blow-out portion A 12 and the blow-out portion B 18 configured as above, a wind direction range necessary to send air to the driver 72 during a cooling operation, that is, a wind direction range from the head to the stomach of the driver 72 can be covered. In addition, air can be sent to a face of an occupant seated in the backseat. Hence, in comparison with, for example, the comparative example of FIG. 10, comfortability in the compartment can be upgraded markedly in the present embodiment.

In the present embodiment, as is shown in FIG. 3, the air volume regulation door A 24 regulates an air volume ratio of a volume of air blown out from the outlet A 121 and a volume of air blown out from the outlet B 181. Hence, by generating a difference in air volume between the two layers making up an airflow, a wind velocity can be changed separately for air blown out from the outlet A 121 and air blown out from the outlet B 181. Consequently, an airflow desirable to the driver 72 can be created easily.

In the present embodiment, by positioning the air volume regulation door A 24 at a predetermined position within the rotatable range of the air volume regulation door A 24, the airflows FL1 and FL2 as shown in FIG. 6 can be created. That is, the air volume regulation door A 24 regulates an air volume ratio of air blown out from the outlet A 121 and air blown out from the outlet B 181 in such a manner that a wind velocity of the second airflow FL2 becomes lower than a wind velocity of the first airflow FL1 and the first airflow FL1 and the second airflow FL2 generate a difference in wind velocity, with which the second airflow FL2 is drawn to the first airflow FL1. Accordingly, as is shown in FIG. 6, when the second airflow FL2 on the upper side is drawn and merged into the first airflow FL1 on the lower side, the first airflow FL1 is forced to head diagonally downward due to an influence of the second airflow FL2.

Hence, the air volume regulation door A 24 is capable of widening a wind direction range of the first airflow FL1 to a lower side with the use of the second airflow FL2 by regulating an air volume ratio of a volume of air from the outlet A 121 and a volume of air from the outlet B 181.

Second Embodiment

A second embodiment will be described with reference to FIG. 12 through FIG. 15. A noticeable difference of the present embodiment from the air blower device 10 of the first embodiment above is that a blow-out portion 19 is provided. A rest is basically same as the first embodiment above and only a portion different from the first embodiment above will be described. Hereinafter, the blow-out portion 19 is referred to as the blow-out portion C 19.

Figure 12:
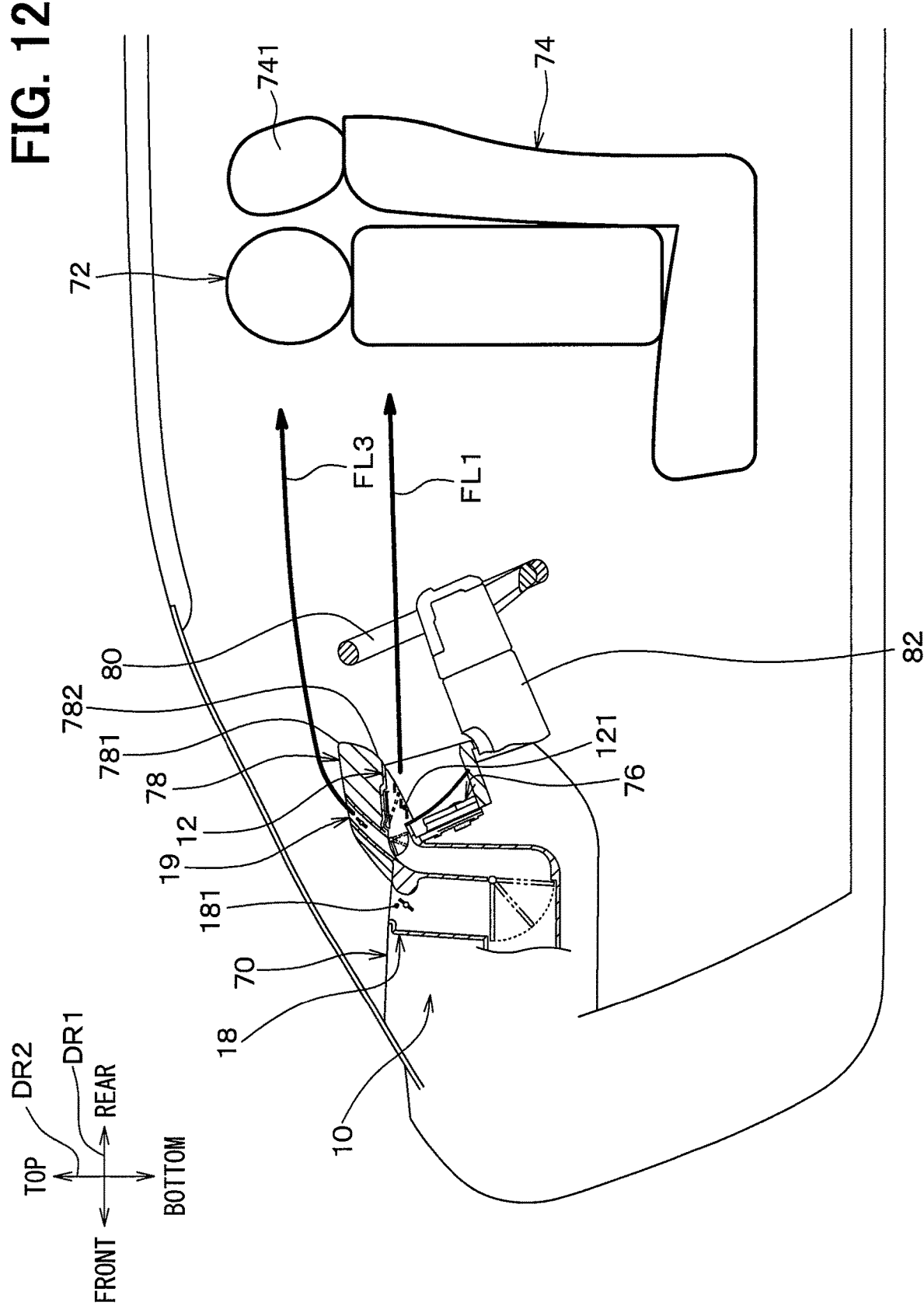
FIG. 12 is a schematic view showing a location of an air blower device of a second embodiment in a compartment and flows of air which the air blower device blows out into the compartment.
Figure 13:
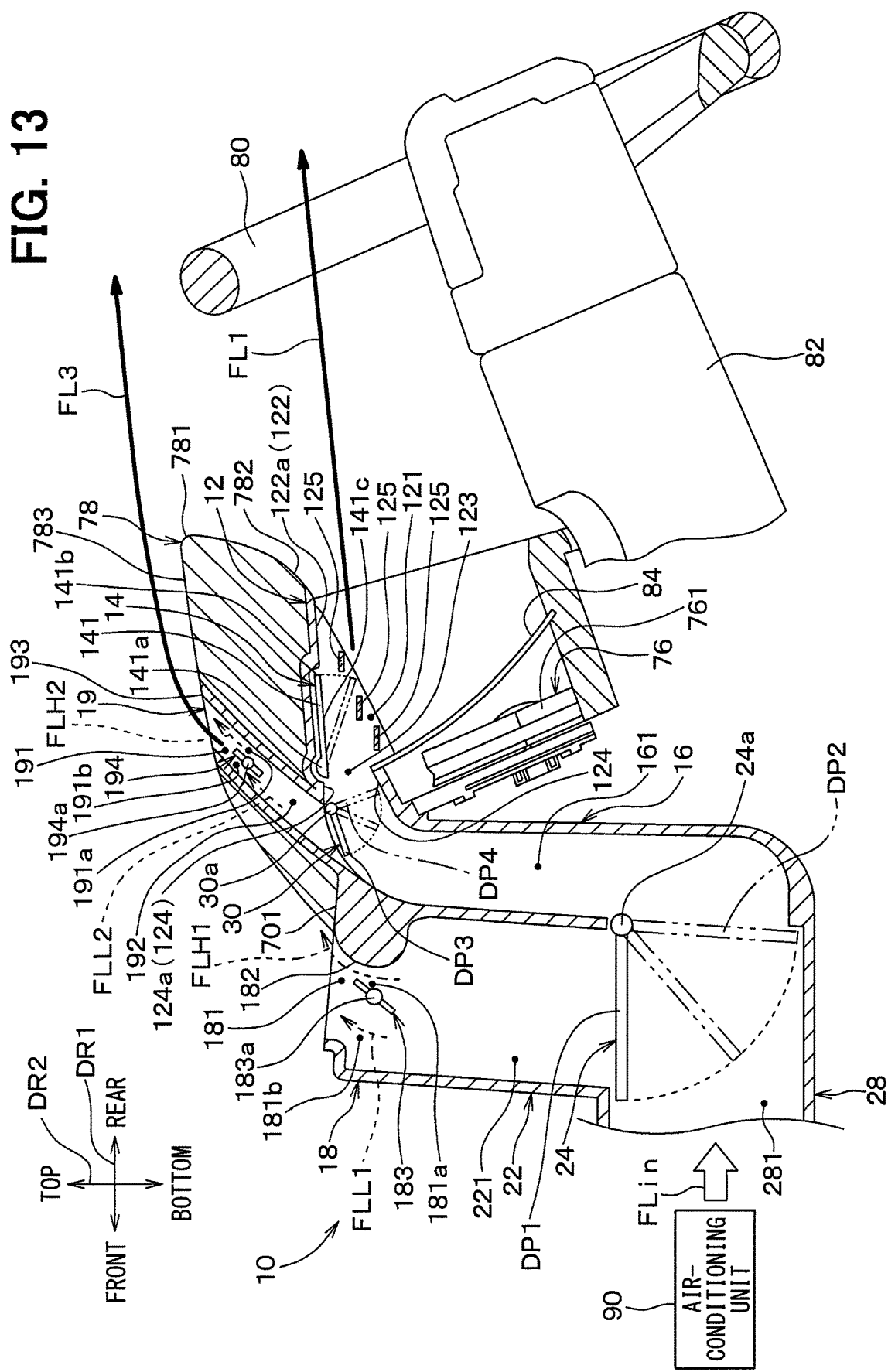
FIG. 13 is an enlarged and detailed view of the air blower device and nearby components extracted from FIG. 12.
Figure 14:
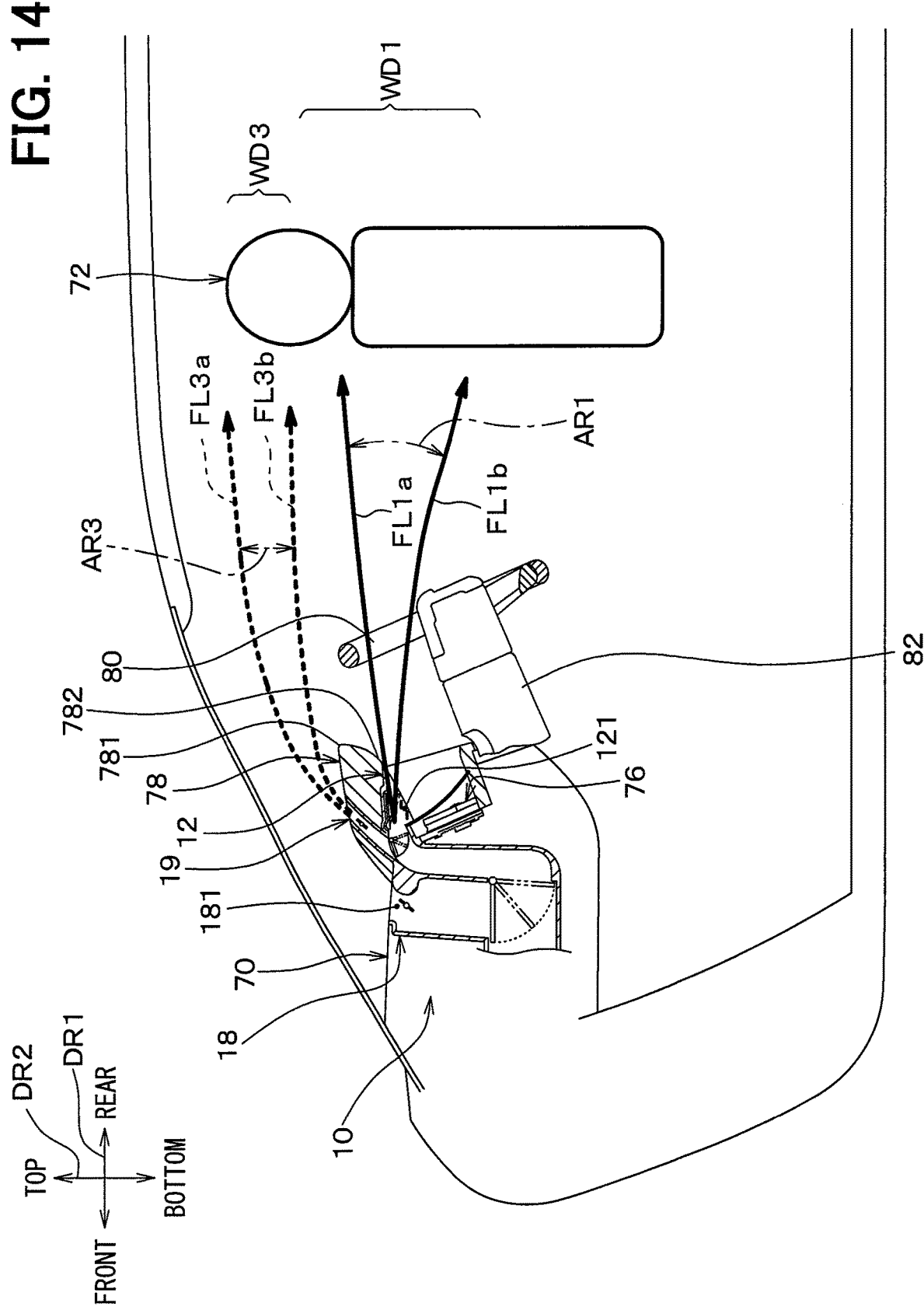
FIG. 14 is a side view same as FIG. 12 showing an air sending range of air which the air blower device blows out into the compartment.

As are shown in FIGS. 12 through 14, an air blower device 10 of the present embodiment includes the blow-out portion C 19 from which air sent from an air-conditioning unit 90 is blown out.

The blow-out portion C 19 is formed integrally with a meter hood 78. The blow-out portion C 19 is provided with an outlet 191 which opens in the meter hood 78 above an outlet A 121 to blow out air from the air-conditioning unit 90 to a vehicle rear side. More specifically, the outlet 191 opens in a hood top surface 783 situated on an opposite side to a hood bottom surface 782 with a hood rear end 781 of the hood meter 78 in between. The outlet 191 opens faced up. The outlet 191 includes a branch passage 192 provided to branch off from a blow-out air passage 123 to cause air from the air-conditioning unit 90 to flow to the outlet 191. Hereinafter, the outlet 191 is referred to as the outlet C 191.

Figure 15:
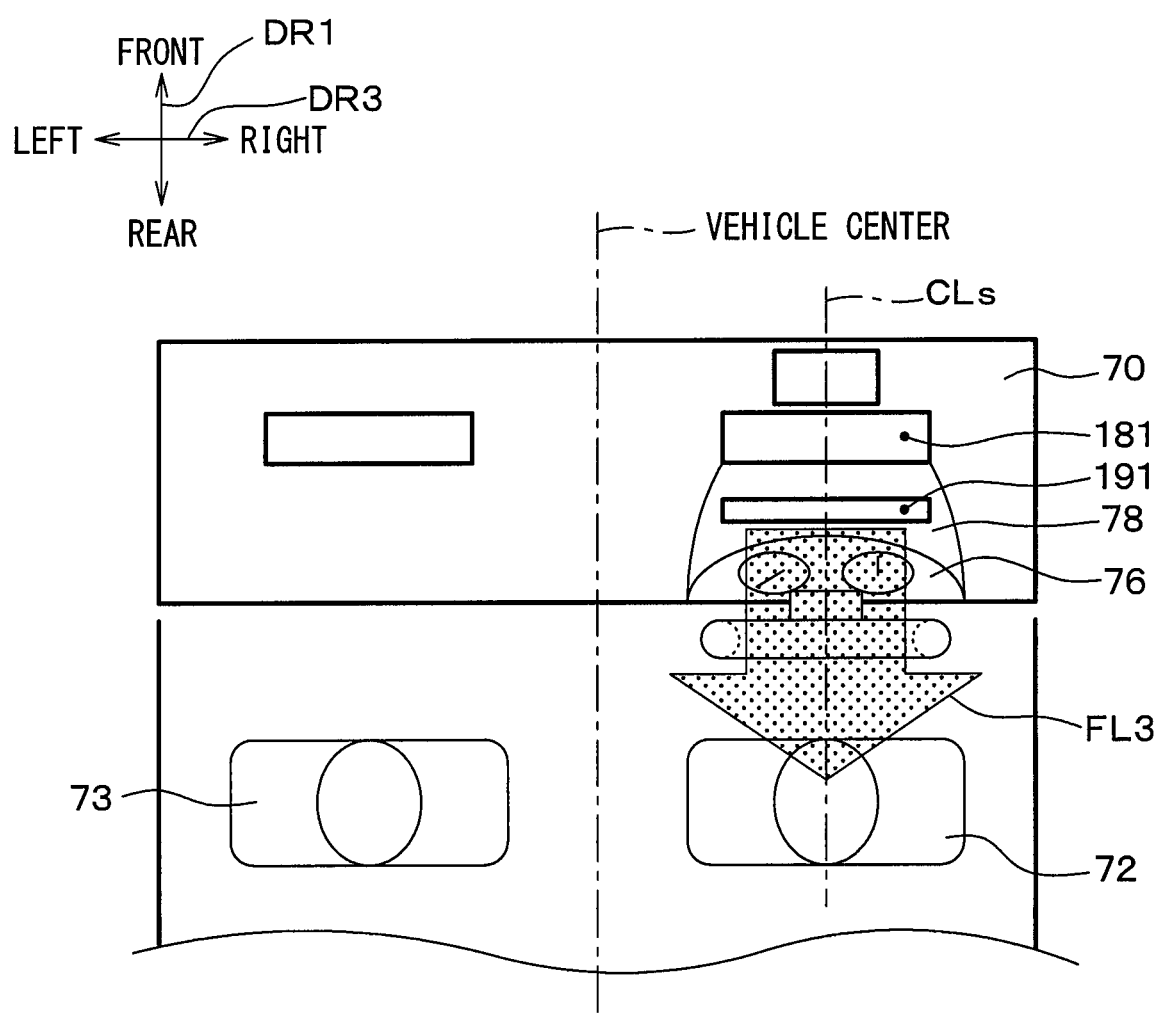
FIG. 15 is a schematic view of a vehicle front portion in the compartment in the second embodiment when viewed from above a vehicle.

As is shown in FIG. 15, the blow-out portion C 19 is formed symmetrically in a vehicle width direction DR3 with respect to a center position CLs of a steering wheel 80. A blow-out portion B 18 is thus capable of blowing out an airflow symmetrical in the vehicle width direction DR3 about the center position CLs of the steering wheel 80 toward a driver 72.

The blow-out portion C 19 changes a direction of an airflow blown out from the outlet C 191 in accordance with the same principle underlying an air blower device described in JP-A-2014-210564. That is, the blow-out portion C 19 changes a direction of an airflow to blow out the airflow toward the vehicle rear side due to the Coanda effect.

More specifically, as is shown in FIG. 13, the blow-out portion C 19 has an air guiding surface 193 to change a direction of an airflow to blow out the airflow toward the vehicle rear side. The air guiding surface 193 is an outlet rear surface forming a portion of the blow-out portion C 19 on the vehicle rear side. The air guiding surface 193 is a curved surface of a protruding shape in cross section when viewed in the vehicle width direction DR3 of FIG. 2, that is, in a cross section of FIG. 13. The phrase, "in cross section when viewed in the vehicle width direction DR3", represents a shape in cross section orthogonal to the vehicle width direction DR3. Hereinafter, the air guiding surface 193 is referred to as the air guiding surface C 193.

More specifically, the air guiding surface 193 is curved in such a manner that an airflow downstream side of the air guiding surface 193 warps to the vehicle rear side with respect to an airflow upstream side. The air guiding surface 193 is provided in such a manner that an airflow downstream end of the air guiding surface 193 smoothly continues to the hood top surface 783.

The blow-out portion C 19 also has an outlet door 194. The outlet door 194 is a rotary door in a flat plate shape provided inside the blow-out portion C 19 and rotating about a center shaft 194a extending in the vehicle width direction DR3. The outlet door 194 rotates under electrical control of an electronic control unit. Hereinafter, the outlet door 194 is referred to as the third outlet door 194.

The third outlet door 194 increases and decreases a passage sectional area of a rear-side air passage 191a defined between the third outlet door 194 and the air guiding surface C 193 in the outlet C 191 with rotational motion of the third outlet door 194. By narrowing down the rear-side air passage 191a in the manner as above, the third outlet door 194 raises a flow velocity of an airflow passing through the rear-side air passage 191a to change the accelerated airflow to a high-speed airflow FLH2 which bends along the air guiding surface C 193 due to the Coanda effect.

Air also flows a front-side air passage 191b formed on a vehicle front side of the third outlet door 194 in the outlet C 191. It should be noted, however, that an airflow passing through the front-side air passage 191b forms a low-speed airflow FLL2 slower than the high-speed airflow FLH2 passing through the rear-side air passage 191a and is therefore drawn to the high-speed airflow FLH2. Hence, as is shown in FIG. 13, air passing through the front-side air passage 191b flows to the vehicle rear side with air passing through the rear-side air passage 191a as is indicated by an arrow FL3.

By using the Coanda effect as above, the blow-out portion C 19 forces air blown out from the outlet C 191 to head to the vehicle rear side by causing the air to flow along the air guiding surface C 193 while forming the airflow heading to the vehicle rear side above the steering wheel 80 as is indicated by the arrow FL3.

As is shown in FIG. 14, a blowing direction of air blown out from the outlet C 191 is regulated up and down as is indicated by an arrow AR3 according to a flow rate of air flowing into the blow-out portion C 19 and a rotational angle of the third outlet door 194. For example, air from the outlet C 191 is regulated by the third outlet door 194 and sent within a wind direction range WD3, which is a range from a head to a periphery of a throat of the driver 72 plus a face of an occupant seated in a backseat. In FIG. 14, an arrow FL3*a* indicates an airflow flowing in an uppermost tier in an air sending range of the blow-out portion C 19 and an arrow FL3*b* indicates an airflow flowing in a lowermost tier in the air sending range of the blow-out portion C 19.

As is shown in FIG. 13, when a passage sectional area of the rear-side air passage 191*a* is reduced by the third outlet door 194 and a flow velocity of the high-speed airflow FLH2 passing through the rear-side air passage 191*a* rises, a blowing direction of air blown out from the outlet C 191 changes from a direction indicated by the arrow FL3*a* to a direction indicated by the arrow FL3*b*.

As is shown in FIG. 13, the air blower device 10 of the present embodiment has a configuration in which a first duct portion 16 is provided with the branch passage 192 branched off from the blow-out air passage 123. In short, a first duct passage 161 is provided upstream of the branch passage 192 in a flow of air. Hence, in the air blower device 10 of the present embodiment, air sent from the air conditioning unit 90 flows into the first duct passage 161 and the air flowing into the first duct passage 161 flows to the branch passage 192 in the first duct portion 16.

As is shown in FIG. 13, an air volume regulation door 30 is provided upstream of the blow-out air passage 123 in the first duct portion 16. That is, an air passage in the first duct portion 16 branches to the blow-out air passage 123 and the branch passage 192 due to the air volume regulation door 30 provided as above. Hereinafter, the air volume regulation door 30 is referred to as the air volume regulation door B 30.

The air volume regulation door B 30 is an air volume regulation device which regulates an air volume ratio of a volume of air blown out from the outlet A 121 and a volume of air blown out from the outlet C 191.

More specifically, the air volume regulation door B 30 is a rotary door in a flat plate shape rotating about a center shaft 30*a* extending in the vehicle width direction DR3. The air volume regulation door B 30 rotates under electrical control of the electronic control unit. Herein, so-called a cantilever door is adopted as the air volume regulation door B 30. It should be appreciated, however, that the air volume regulation door B 30 is not limited to the configuration as above and a butterfly door and a sliding door can be adopted as well.

The air volume regulation door B 30 increases and decreases an opening area at an inlet of the blow-out air passage 123 and an opening area at an inlet of the branch passage 192 according to a rotational position of the air volume regulation door B 30. The air volume regulation door B 30 regulates the air volume ratio by increasing and decreasing the opening areas. The air volume regulation door B 30 continuously rotates within a rotatable range from a first position DP3 at which the air volume regulation door B 30 fully opens the inlet of the blow-out air passage 123 while fully closing the inlet of the branch passage 192 to a second position DP4 at which the air volume regulation door B 30 fully opens the inlet of the branch passage 192 while fully closing the inlet of the blow-out air passage 123. For example, by positioning the air volume regulation door B 30 at an intermediate position between the first position DP3 and the second position DP4, air sent inside can be blown out from both of the blow-out portion A 12 and the blow-out portion C 19.

A wind velocity of air blown out from the blow-out portion A 12 rises as a flow rate of air flowing into the blow-out air passage 123 increases and a wind velocity of air blown out from the blow-out portion C 19 rises as a flow rate of air flowing into the branch passage 192 increases. The air volume regulation door B 30 is thus capable of changing a difference in wind velocity generated between a first airflow FL1 blown out from the outlet A 121 and the airflow FL3 (referred to as the third airflow FL3) blown out from the outlet B 181. Hereinafter, the airflow FL3 is referred to as the third airflow FL3.

The third airflow FL3 has a smaller difference in wind velocity from the first airflow FL1 than a second airflow FL2. Hence, as is shown in FIG. 12, unlike the second airflow FL2, the third airflow FL3 is readily sent above the first airflow FL1 without being drawn to the first airflow FL1. The air blower device 10 of the present embodiment is thus capable of realizing sending of air to the head and a periphery of a face of the driver 72 by regulating the third outlet door 194. FIG. 12 is a view showing a state of airflows the air blower device 10 blows out into the compartment and schematically showing a manner in which the third airflow FL3 from the outlet C 191 flows without being drawn to the first airflow FL1 from the outlet A 121.

Other Embodiments (1) In the embodiments described above, the singular outlet A 121 is provided to the meter hold 78. However, two or more outlets A 121 may be provided as well. In such a case, it is preferable that all the outlets A 121 are formed symmetrically in the vehicle width direction DR3 with respect to the center position CLs of the steering wheel 80.

(2) In the embodiments described above, the outlet A 121 opens in the hood bottom surface 782 of the meter hood 78. However, the outlet A 121 does not necessarily open in the hood bottom surface 782. For example, the outlet A 121 may open in the meter peripheral portion 762 of the meter panel 76 instead of the hood bottom surface 782. That is to say, the outlet A 121 only has to open somewhere in a meter peripheral region made up of the meter peripheral portion 762, which is a portion other than the meters 761 in the meter panel 76, and the meter hood 78.

(3) In the embodiments above, as is shown in FIG. 3, the hood bottom surface 782 of the meter hood 78 where the outlet A 121 opens is formed into a smooth curved surface. However, the hood bottom surface 782 is not necessarily a smooth surface. For example, a step may be provided to the hood bottom surface 782.

(4) In the embodiments above, as is shown in FIG. 3, the multiple outlet ribs 125 are provided inside the outlet A 121. However, the outlet ribs 125 may be omitted. Alternatively, same multiple outlet ribs 125 may be provided inside the outlet C 191. That is, given that a direction orthogonal to the flow direction FL3 of air blown out from the outlet C 191 is a thickness direction, then the respective outlet ribs 125 may be provided inside the outlet C 191 to lie across the outlet C 191 in the vehicle width direction DR3. When configured in such a manner, foreign matter can be restricted from coming into the blow-out portion C 19 through the outlet C 191 while restricting an interference with an airflow blown out from the outlet C 191.

(5) In the embodiment described above, the outlet C 191 opens in the hood top surface 783 of the meter hood 78. However, the outlet C 191 does not necessarily open in the hood top surface 783. For example, the outlet C 191 may open in the hood bottom surface 782 of the meter panel 76 instead of the hood top surface 783. That is, the outlet C 191 only has to open somewhere in a meter peripheral region made up of the meter peripheral portion 762, which is a portion other than the meters 761 in the meter panel 76, and the meter hood 78.

Figure 16:
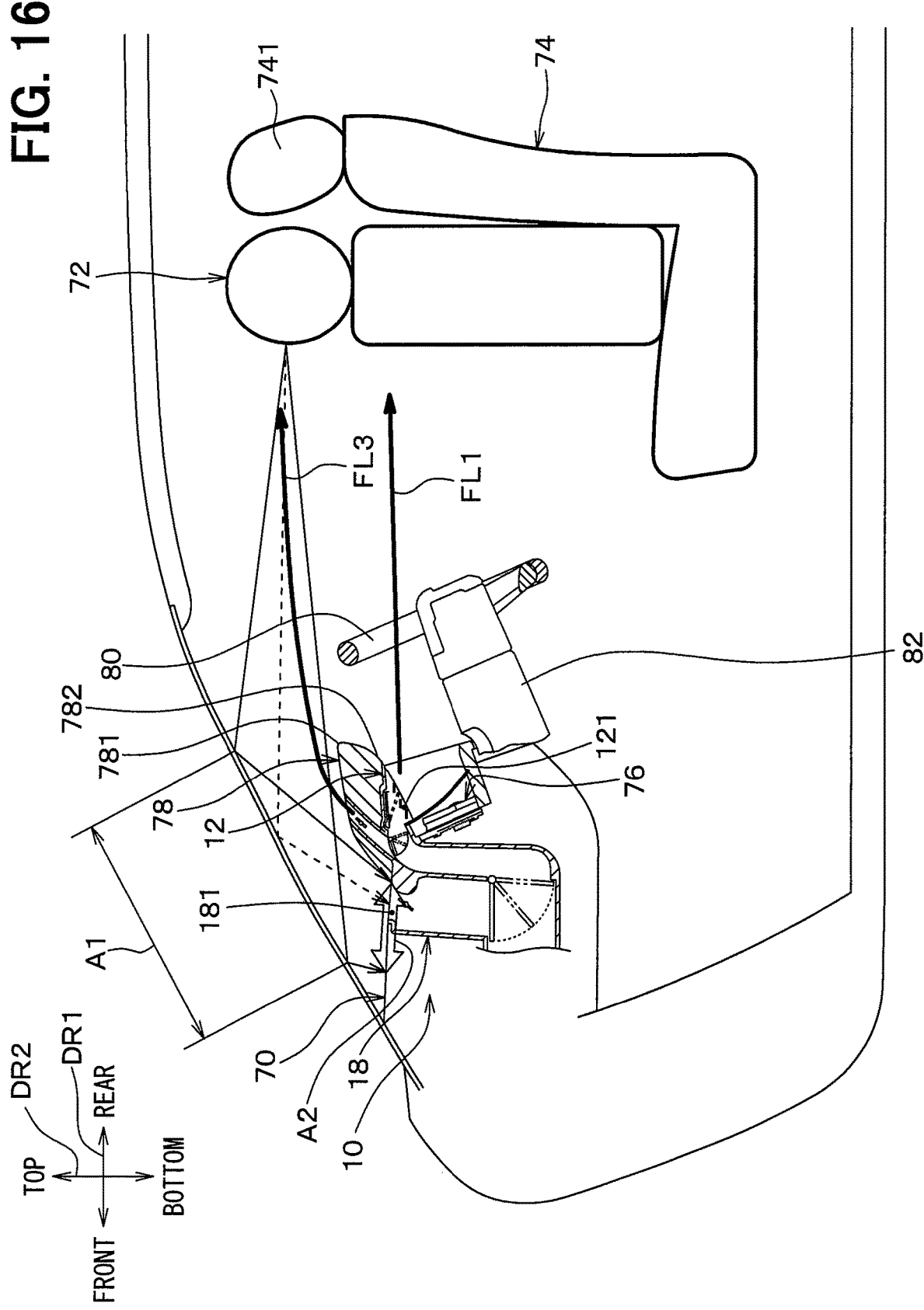
FIG. 16 is a side view same as FIG. 12 schematically showing a region in a windshield of a vehicle, which often becomes an obstacle for a driving operation of a driver.

(6) In the second embodiment above, the blow-out portion B 18 may be omitted. In such a case, because the blow-out portion C 19 is present, air is blown out from the outlet C 191. Hence, air can be blown out above air blown out from the outlet A 121 even in the absence of the blow-out portion B 18. In addition, another component, for example, a head-up display, may be provided at a position at which the blow-out portion B 18 is provided otherwise, that is, on the vehicle front side of the outlet A 121 and the outlet C 191. In a case where the blow-out portion B 18 is provided, as is shown in FIG. 16, the outlet B 181 is reflected on a windshield of the vehicle due to reflection of light, which often becomes an obstacle for a driving operation of the driver 72. However, when the blow-out portion B 18 is omitted, such an obstacle for a driving operation hardly arises. Normally, an object provided on the vehicle front side of the instrument panel 70 is reflected in a region A1, which is a region of the windshield becoming an obstacle for a driving operation of the driver 72. Hence, when the blow-out portion B 18 is provided, the outlet B 181 situated on a vehicle front side A2 of the meter hood 78 is reflected in the region A1 of the windshield and often becomes an obstacle for a driving operation of the driver 72. On the contrary, when the blow-out portion B 18 is omitted, such an inconvenience hardly occurs and sending of air above air sent from the first blow-out portion 19 can be created by the blow-out portion C 19.

(7) The embodiments described above have a configuration in which the first outlet door 14 is provided as the blowing direction regulation device which regulates a blowing direction of air blown out from the outlet A 121 up and down. As is shown in FIG. 17, in the embodiments described above, wind direction adjustment louvers 40 and 50 may be further provided to the blow-out portion A 12 to regulate a blowing direction of air blown out from the outlet A 121 in the vehicle width direction. Herein, a wind direction adjustment louver A 40 provided to the blow-out portion A 12 to regulate a blowing direction of air blown out from the outlet A 121 and a wind direction adjustment lover B 50 provided to the blow-out portion C 19 to regulate a blowing direction of air blown out from the outlet C 191 are provided. For example, the wind direction adjustment louvers 40 and 50 may adopt a configuration driven under electrical control of the electronic control unit to regulate a blowing direction of air in the vehicle width direction by swinging in the vehicle width direction. More specifically, as is shown in, for example, FIG. 17, a configuration allowing the wind direction adjustment louver 40 to swing in response to a rotation of a rotation shaft 40a which rotates while being fixed to the blow-out portion A 12 may be adopted. Likewise, a configuration allowing the wind direction adjustment louver 50 to swing in response to a rotation of a rotation shaft 50a which rotates while being fixed to the blow-out portion C 19 may be adopted. Alternatively, as is shown in FIG. 18, a ventilation register 401 regulating a blowing direction of air blown out from the outlet A 121 up and down may be provided or a ventilation register 501 regulating a blowing direction of air blown out from the outlet C 191 up and down may be provided to the blow-out portion C 19. The ventilation registers 401 and 501 referred to herein mean a ventilation hole capable of regulating a flow rate.

It should be appreciated that the present disclosure is not limited to the embodiments described above and can be modified as needed. In the embodiments described above, it is needless to say that elements forming the respective embodiments are not necessarily essential unless explicitly expressed as being essential or obviously being essential in principle. The numbers, numerical values, amounts, ranges, and so on of elements forming the respective embodiments are not limited to particular figures specified above unless explicitly expressed as being essentially limited to or obviously being limited in principle to the specified figures. Materials, shapes, positional relations, and so on of elements forming the respective embodiments are not limited to particular materials, shapes, positional relations, and so on specified above unless explicitly expressed as being limited to or obviously being limited in principle to the specified materials, shapes, positional relations, and so on.

What is claimed is:

1. An air blower device, comprising:
    a blow-out portion A having an outlet A opening in a meter peripheral region to blow out air from an air conditioner in a vehicle rear direction through a steering wheel provided between the meter panel and the driver's seat in a vehicle front-rear direction, wherein the meter peripheral region includes: a portion, which is other than a meter in a meter panel provided in a vehicle front direction of a driver's seat in a compartment; and a meter hood provided to spread in a vehicle width direction above the meter panel and protruding in the vehicle rear direction farther than the meter panel;
    a blowing direction regulation device provided to the blow-out portion A, having an air guiding surface A along which air blown out from the outlet A flows, and regulating a blowing direction of air blown out from the outlet A by changing an angle of the air guiding surface A; and
    a blow-out portion B provided with an outlet B from which air from the air conditioner is blown out, wherein
    the outlet B opens faced up and is located more in the vehicle front direction than the outlet A,
    the blow-out portion B has an outlet rear surface forming a portion of the outlet B in the vehicle rear direction,
    the outlet rear surface is curved in such a manner that an airflow downstream side of the outlet rear surface wraps in the vehicle rear direction with respect to an airflow upstream side,
    the blow-out portion B forces air blown out from the outlet B to head in the vehicle rear direction by causing the air to flow along the outlet rear surface while forming an airflow heading in the vehicle rear direction above the steering wheel,
    the blow-out portion A is provided with a blow-out air passage extending from the outlet A in the vehicle front direction to cause air from the air conditioner to flow to the outlet A,
    the blowing direction regulation device has a plate-shaped air guiding member provided with the air guiding surface A,
    the air guiding member is provided relatively on an upper side in the blow-out air passage, and
    the air guiding member has a front end in the vehicle front direction and regulates a blowing direction of air blown out from the outlet A up and down by rotating about the front end.

2. The air blower device according to claim 1, wherein the meter hood has: a hood rear end located rearmost in the meter hood in the vehicle rear direction; and a hood bottom surface provided below the hood rear end and extending diagonally downward in the vehicle front direction, and the outlet A opens in the hood bottom surface in the meter peripheral region and faces in the vehicle rear direction.

3. The air blower device according to claim 1, wherein given that a region of the blow-out air passage upper than a center of the blow-out air passage in a top-bottom direction is an upper region of the blow-out air passage, then the air guiding member is provided in such a manner that at least a part of the air guiding member is situated in the upper region of the blow-out air passage.

4. The air blower device according to claim 1, wherein given that a region of the blow-out air passage upper than a center of the blow-out air passage in a top-bottom direction is an upper region of the blow-out air passage, then the air guiding member is provided in such a manner that the air guiding member is entirely situated in the upper region of the blow-out air passage.

5. The air blower device according to claim 1, further comprising:
an intermediate duct portion provided upstream of the blow-out air passage with respect to a flow of air and provided with an air passage where air from the air conditioner flows, wherein
the intermediate duct portion is provided in the vehicle front direction of the meter panel.

6. The air blower device according to claim 1, wherein the blow-out portion A has an outlet rib provided to lie across the outlet A and restricting foreign matter from coming inside through the outlet A.

7. The air blower device according to claim 1, further comprising:
an air volume regulation device A regulating an air volume ratio of a volume of air blown out from the outlet A and a volume of air blown out from the outlet B.

8. The air blower device according to claim 7, wherein the air volume regulation device A regulates the air volume ratio in such a manner that: a wind velocity of an airflow blown out from the outlet B becomes lower than a wind velocity of an airflow blown out from the outlet A; and the airflow from the outlet A and the airflow from the outlet B generate a difference in wind velocity, with which the airflow from the outlet B is drawn to the airflow from the outlet A.

9. The air blower device according to claim 1, further comprising:
a duct A through which air flows from the air conditioner to the outlet A;
a duct B through which air flows from the air conditioner to the outlet B; and
an air volume regulation door, wherein
a portion of the duct A and a portion of the duct B downstream of the air conditioner and the air volume regulation door extend vertically upward and are parallel to each other.

10. The air blower device according to claim 9, wherein the duct B is located more in the vehicle front direction than the duct A.

11. An air blower device, comprising:
a blow-out portion A having an outlet A opening in a meter peripheral region to blow out air from an air conditioner in a vehicle rear direction through a steering wheel provided between the meter panel and the driver's seat in a vehicle front-rear direction, wherein the meter peripheral region includes: a portion, which is other than a meter in a meter panel provided in a vehicle front direction of a driver's seat in a compartment; and a meter hood provided to spread in a vehicle width direction above the meter panel and protruding in the vehicle rear direction farther than the meter panel;
a blowing direction regulation device provided to the blow-out portion A, having an air guiding surface A along which air blown out from the outlet A flows, and regulating a blowing direction of air blown out from the outlet A by changing an angle of the air guiding surface A; and
a blow-out portion B provided with an outlet B from which air from the air conditioner is blown out, wherein
the outlet B opens faced up and is located more in the vehicle front direction than the outlet A,
the blow-out portion B has an outlet rear surface forming a portion of the outlet B in the vehicle rear direction,
the outlet rear surface is curved in such a manner that an airflow downstream side of the outlet rear surface wraps in the vehicle rear direction with respect to an airflow upstream side,
the blow-out portion B forces air blown out from the outlet B to head in the vehicle rear direction by causing the air to flow along the outlet rear surface while forming an airflow heading in the vehicle rear direction above the steering wheel,
the blow-out portion A is provided with a blow-out air passage extending from the outlet A in the vehicle front direction to cause air from the air conditioner to flow to the outlet A,
the blowing direction regulation device has a plate-shaped air guiding member provided with the air guiding surface A,
the air guiding member is provided relatively on an upper side in the blow-out air passage,
the blow-out portion A has: an outlet rim portion forming a rim of the outlet A; and a passage inner wall surface surrounding and thereby defining the blow-out air passage, and
the passage inner wall surface is provided in such a manner that an upper portion of the passage inner wall surface extends diagonally downward in the vehicle front direction from an upper portion of the outlet rim portion.

12. An air blower device, comprising:
a blow-out portion A having an outlet A opening in a meter peripheral region to blow out air from an air conditioner in a vehicle rear direction through a steering wheel provided between the meter panel and the driver's seat in a vehicle front-rear direction, wherein the meter peripheral region includes: a portion, which is other than a meter in a meter panel provided in a vehicle front direction of a driver's seat in a compartment; and a meter hood provided to spread in a vehicle width direction above the meter panel and protruding in the vehicle rear direction farther than the meter panel;
a blowing direction regulation device provided to the blow-out portion A, having an air guiding surface A along which air blown out from the outlet A flows, and regulating a blowing direction of air blown out from the outlet A by changing an angle of the air guiding surface A; and
a blow-out portion B provided with an outlet B from which air from the air conditioner is blown out, wherein
the outlet B opens faced up and is located more in the vehicle front direction than the outlet A, the blow-out portion B has an outlet rear surface forming a portion of the outlet B in the vehicle rear direction, the outlet rear surface is curved in such a manner that an airflow downstream side of the outlet rear surface wraps in the vehicle rear direction with respect to an airflow upstream side, the blow-out portion B forces air blown out from the outlet B to head in the vehicle rear direction by causing the air to flow along the outlet rear surface while forming an airflow heading in the vehicle rear direction above the steering wheel, the blow-out portion A is provided with a blow-out air passage extending from the outlet A in the vehicle front direction to cause air from the air conditioner to flow to the outlet A, the blowing direction regulation device has a plate-shaped air guiding member provided with the air guiding surface A, the air guiding member is provided relatively on an upper side in the blow-out air passage, the blow-out portion A has: an outlet rim portion forming a rim of the outlet A; and a passage inner wall surface surrounding and thereby defining the blow-out air passage, and the passage inner wall surface is provided in such a manner that an upper portion of the passage inner wall surface extends diagonally upward in the vehicle rear direction toward an upper portion of the outlet rim portion.

13. An air blower device, comprising:

a blow-out portion A having an outlet A opening in a meter peripheral region to blow out air from an air conditioner in a vehicle rear direction through a steering wheel provided between the meter panel and the driver's seat in a vehicle front-rear direction, wherein the meter peripheral region includes: a portion, which is other than a meter in a meter panel provided in a vehicle front direction of a driver's seat in a compartment; and a meter hood provided to spread in a vehicle width direction above the meter panel and protruding in the vehicle rear direction farther than the meter panel;

a blowing direction regulation device provided to the blow-out portion A, having an air guiding surface A along which air blown out from the outlet A flows, and regulating a blowing direction of air blown out from the outlet A by changing an angle of the air guiding surface A;

a blow-out portion B provided with an outlet B from which air from the air conditioner is blown out; and a blow-out portion C provided with an outlet C opening in the meter hood above the outlet A to blow out air from the air conditioner in the vehicle rear direction, wherein the outlet B opens faced up and is located more in the vehicle front direction than the outlet A, the blow-out portion B has an outlet rear surface forming a portion of the outlet B in the vehicle rear direction, the outlet rear surface is curved in such a manner that an airflow downstream side of the outlet rear surface wraps in the vehicle rear direction with respect to an airflow upstream side, the blow-out portion B forces air blown out from the outlet B to head in the vehicle rear direction by causing the air to flow along the outlet rear surface while forming an airflow heading in the vehicle rear direction above the steering wheel, the blow-out portion A is provided with a blow-out air passage extending from the outlet A in the vehicle front direction to cause air from the air conditioner to flow to the outlet A, and the blow-out portion C is provided with a branch passage branched off from the blow-out air passage to cause air from the air conditioner to flow to the outlet C.

14. The air blower device according to claim 13, wherein the branch passage branches off from the blow-out air passage at a point upstream of the air guiding surface A in a flow of air.

15. The air blower device according to claim 13, further comprising:

an air volume regulation device B regulating an air volume ratio of a volume of air blown out from the outlet A and a volume of air blown out from the outlet C.

16. The air blower device according to claim 13, wherein the blow-out portion C is provided with an air guiding surface C for a flow of air blown out from the outlet C to bend along a wall surface of the air guiding surface C.

17. An air blower device, comprising:

a blow-out portion A having an outlet A opening in a meter peripheral region to blow out air from an air conditioner in a vehicle rear direction through a steering wheel provided between the meter panel and the driver's seat in a vehicle front-rear direction, wherein the meter peripheral region includes: a portion, which is other than a meter in a meter panel provided in a vehicle front direction of a driver's seat in a compartment; and a meter hood provided to spread in a vehicle width direction above the meter panel and protruding in the vehicle rear direction farther than the meter panel;

a blowing direction regulation device provided to the blow-out portion A, having an air guiding surface A along which air blown out from the outlet A flows, and regulating a blowing direction of air blown out from the outlet A by changing an angle of the air guiding surface A;

a blow-out portion B provided with an outlet B from which air from the air conditioner is blown out; and a second outlet door that is a rotary door in a flat plate shape provided inside the outlet B and rotational about a center shaft extending in the vehicle width direction wherein the outlet B opens faced up and is located more in the vehicle front direction than the outlet A, the blow-out portion B has an outlet rear surface forming a portion of the outlet B in the vehicle rear direction, the outlet rear surface is curved in such a manner that an airflow downstream side of the outlet rear surface wraps in the vehicle rear direction with respect to an airflow upstream side, the blow-out portion B forces air blown out from the outlet B to head in the vehicle rear direction by causing the air to flow along the outlet rear surface while forming an airflow heading in the vehicle rear direction above the steering wheel, the second outlet door defines a rear-side air passage with the outlet rear surface in the outlet B and defines a front-side air passage more in the vehicle front direction than the second outlet door in the outlet, the second outlet door is rotational to increase and decrease a passage sectional area of the rear-side air passage and a passage sectional area of the front-side air passage, the outlet rear surface of the outlet B is in a curved surface protruding toward the vehicle front direction,
the center shaft of the second outlet door is located in the vehicle rear direction of the front-side air passage; and
the second outlet door is configured to throttle a passage between the second outlet door and the outlet rear surface to direct air blown from the outlet B toward the vehicle rear direction along the second outlet door and the outlet rear surface.

* * * * *